United States Patent [19]

Maher

[11] Patent Number: 4,485,383
[45] Date of Patent: Nov. 27, 1984

[54] GLOBAL POSITION SYSTEM (GPS) MULTIPLEXED RECEIVER

[75] Inventor: Robert A. Maher, Richardson, Tex.

[73] Assignee: Texas Instruments Incorporated, Dallas, Tex.

[21] Appl. No.: 211,500

[22] Filed: Dec. 1, 1980

[51] Int. Cl.³ .............................................. H04B 7/185
[52] U.S. Cl. ..................................... 343/352; 370/104; 375/114
[58] Field of Search ................. 343/100 ST; 370/104; 375/39, 114; 455/304, 305

[56] References Cited

U.S. PATENT DOCUMENTS

| | | | |
|---|---|---|---|
| 3,349,403 | 10/1967 | Kelly et al. | 343/423 |
| 3,373,424 | 3/1968 | Thyssens | 343/6 R |
| 3,430,237 | 2/1969 | Allen | 343/353 X |
| 3,449,748 | 6/1969 | Thyssens | 343/444 |
| 3,742,498 | 6/1973 | Dunn | 370/104 X |
| 3,747,095 | 7/1973 | Wilson | 343/356 X |
| 3,836,721 | 9/1974 | Sugioka | 370/104 |

Primary Examiner—T. H. Tubbesing

Attorney, Agent, or Firm—Alva H. Bandy; N. Rhys Metrett; Melvin Sharp

[57] ABSTRACT

A global position system (GPS) capable of multiple (two or more space vehicles) space vehicle (SV) multiplexing comprises an RF energy receiver for receiving high and low frequencies ($L_1$ and $L_2$) from a plurality of SVs on different codes, a switching means for alternately switching the RF receiver between the coded $L_1$, $L_2$ signals for detection, a digital processing means, replica coded $L_1$, $L_2$ signal producing hardware, and a coherent time and frequency synthesis means, said digital processing means connected to the RF receiver, coherent time and frequency synthesis means, and replica coded $L_1$, $L_2$ signal producing hardware for producing for the RF receiver replica coded $L_1$, $L_2$ signals for each SV to be tracked and adjusting with respect to the coherent time and frequency synthesis circuit the states of the hardware replica receiver signals to align them with corresponding signals of each of the SVs at a rate that supports sampled data closed-loop tracking of the SVs without reacquisition of each SV being tracked.

6 Claims, 21 Drawing Figures

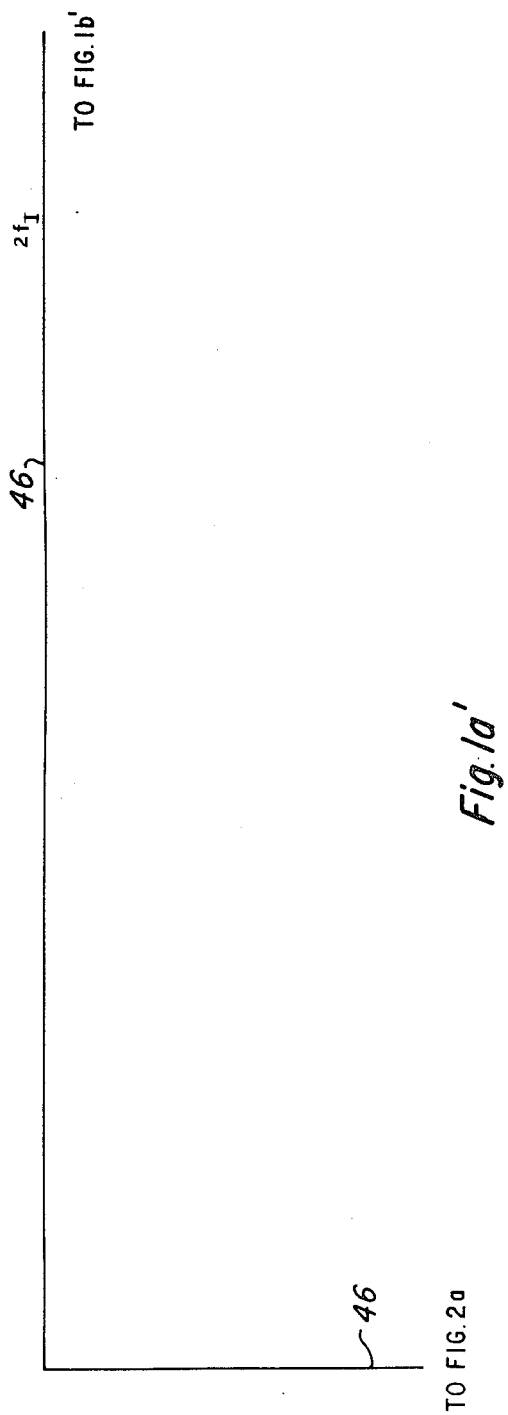

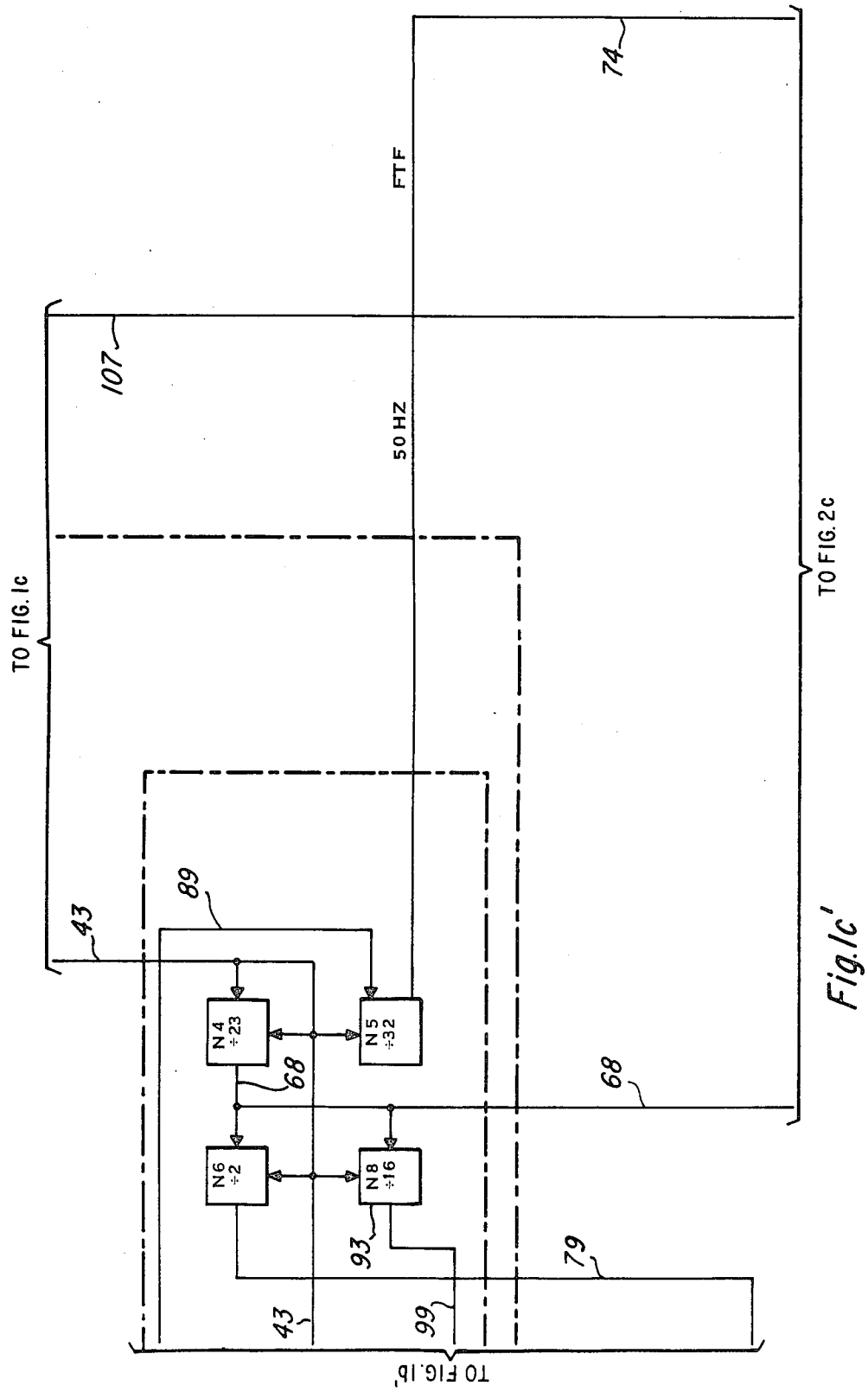

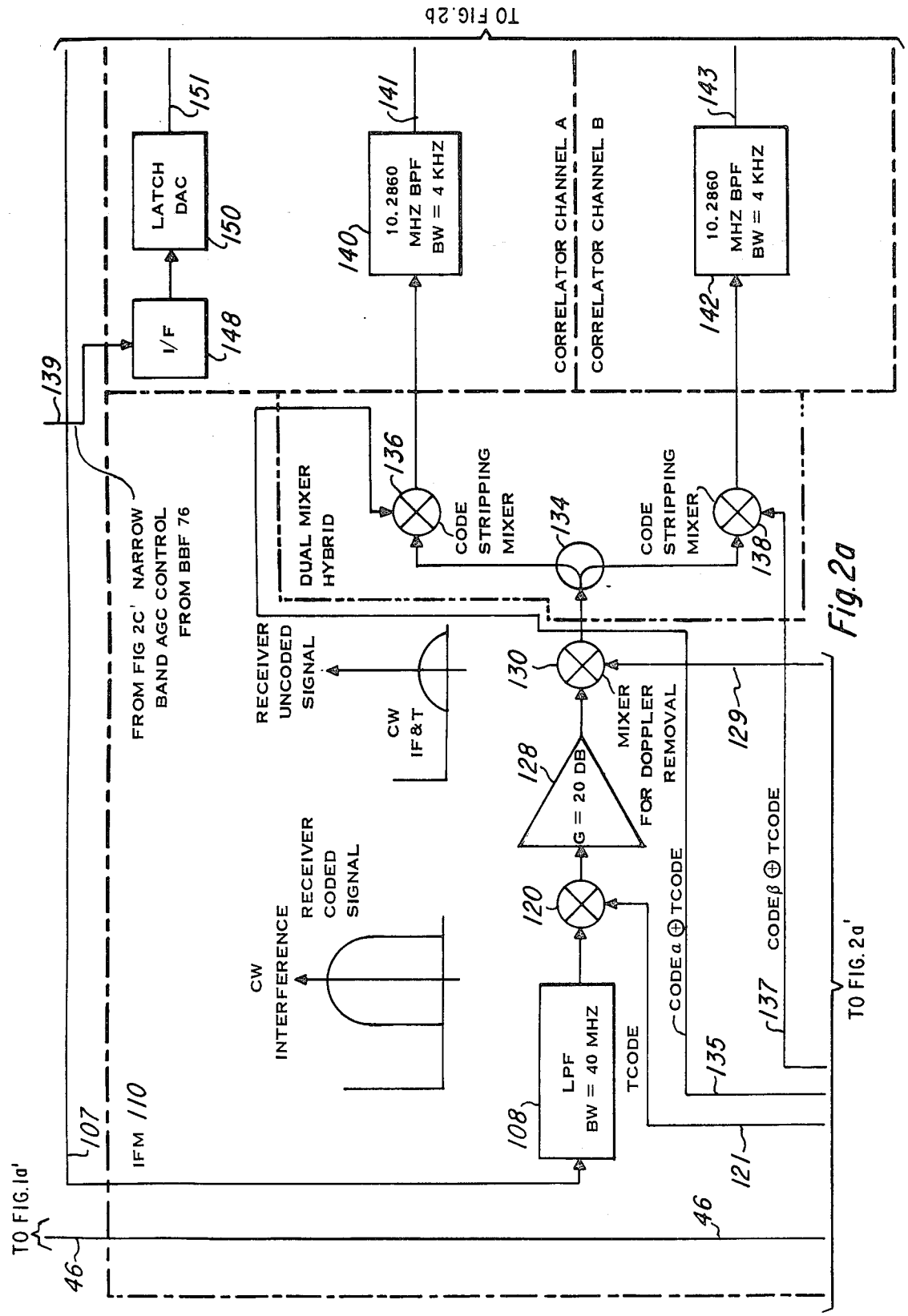

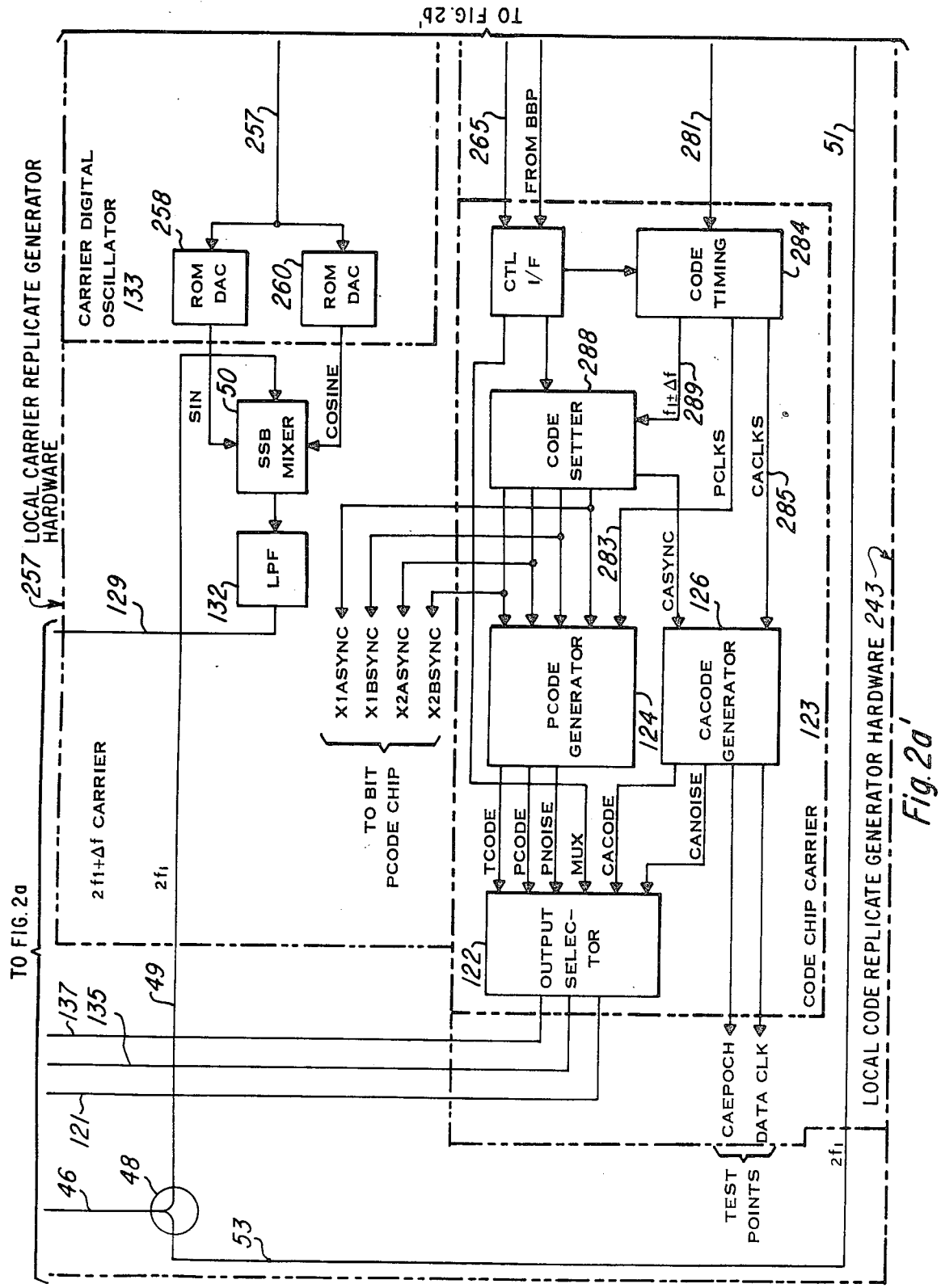

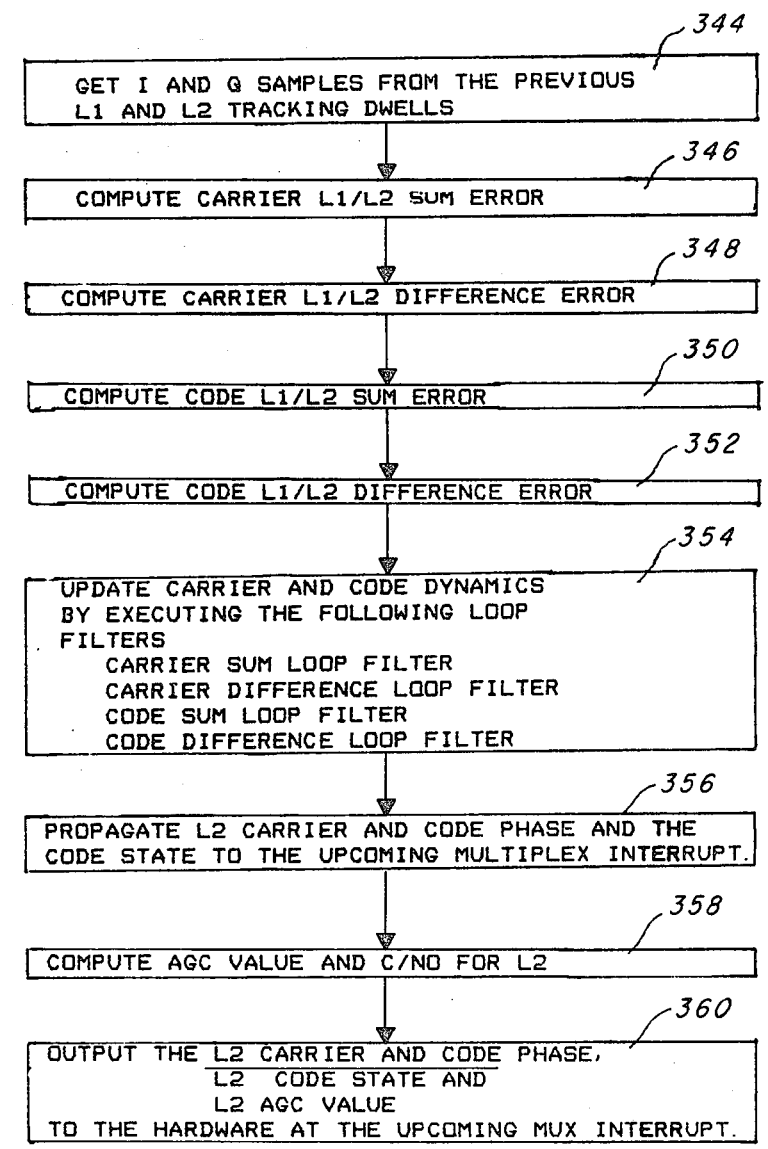

GLOBAL POSITION SYSTEM (GPS) MULTIPLEXED RECEIVER

This invention relates to radio frequency receivers, and more particularly to a global position system (GPS) multiplexed receiver.

The global position system (GPS) is a navigation system which comprises a plurality of space vehicles (satellites) moving in space and transmitting radio frequency signals to earth. The space vehicle's locations at any selected time are precisely known from tables. Thus, by measuring the time it takes to receive an RF signal from a selected space vehicle, the distance from the space vehicle to the receiver can be calculated by multiplying the time by the speed of light. By locating four or more space vehicles and determining the distance of the receiver from the space vehicle, the location of the receiver can be determined by triangulation.

The receiver location is not sufficiently precise because of the ionosphere's effect on the RF signal. To correct for the ionsphere effect, each space vehicle (SV) transmits two carrier signals of preselected frequencies $L_1$ and $L_2$ coded for SV identification. The frequencies $L_1$ and $L_2$ may often be referred to as the high frequency and low frequency signals. These signals are combined to provide sum and difference values. The difference signal provides a measure of the total ionosphere effect after appropriate scaling, and is used to correct the time for transmission. The sum signal tracks the gross dynamics between the SV and the receiver.

Space vehicle identification is made possible by modulating the carrier frequencies $L_1$ and $L_2$ with a p(precision) code or ca (coarse acquisition) code.

In the past, the efficient tracking of navigation satellites of a GPS required separate receiver channels for processing the high ($L_1$) frequency signals and the low ($L_2$) frequency signals transmitted by each satellite and either separate receiver's channels for each satellite of the GPS or the sequential operation of one receiver to receive the high and low frequency signals of each space vehicle for satellite tracking.

The problem associated with the use of separate receivers and channels is the cost thereof, the power required, the weight and the bulk or size of the receiver package. These problems have been reduced by sequencing the receiver from one space vehicle to the next until each space vehicle has been addressed and repeating the sequence cycle for as long as tracking is desired. The problem with sequencing is related to the length of the sequence cycle period. That is, the cycle period is so long that a carrier reacquisition and a code reacquisition are required for each space vehicle of each cycle in order to make accurate measurements. The time to reacquire each space vehicle results in an inefficient utilization of available space vehicle signals and the sample rate of measurements is lower. If the tracking vehicle experiences dynamic stress substantial correction of signals is required to provide accurate fixes of the tracking vehicle. If the tracking vehicle is subject to high dynamics, it is impossible to reacquire space vehicles by the sequential method owing to the lower sample rate.

Accordingly, it is an object of this invention to provide an efficient tracking system with a reduced number of receiver channels.

Another object of the invention is to provide an economical single channel multiplexing receiver which is: capable of tracking multiple space vehicles without reacquisition, compact in size, conservative of power and amenable to mass production techniques.

Still another object of the invention is to provide a multiplexing receiver with effectively continuous receiver tracking characteristics, i.e. a receiver capable (in a sampled data sense) of being switched from one space vehicle to another fast enough to support continuous closed loop tracking of each space vehicle.

A further object of the invention is to provide through multiplexing alone, the capability of continuous SV digital data collection on a plurality of SV signals, using a single set of receiver hardware.

Briefly stated, the invention comprises a coarse acquisition code (ca-code) and a precision code (p-code) global positioning system (GPS) multiplexing receiver which utilizes one channel of receiver hardware under baseband processor control to receive a plurality of coded frequency signals and to track two or more space vehicles at a rate that supports sampled data closed-loop tracking of the SVs thereby eliminating SV reacquisition. That is, each space vehicle is addressed sufficiently fast that the uncertainty in its movement between cycles is insignificant in the loop calculations; thus, it is not necessary to reacquire each space vehicle during a multiplexing cycle. The process of reacquiring each space vehicle is referred to herein as reacquisition. The receiver baseband design is digital; thus, many receiver functions are implemented in software; the baseband software functions can also be implemented on either hardwire or firmware.

Other objects and features of the invention will become more readily apparent from the following detailed description when read in conjunction with the accompanying drawings, in which like reference numerals designate like parts throughout the figures thereof, and in which:

FIGS. 1a–1c and 1a'–1c' constitute a schematic diagram of the antenna preamplifier and the coherent time and frequency synthesis circuit;

FIGS. 2a–2c and 2a'–2c' constitute a schematic of the intermediate frequency module (IFM) and local carrier and code replicate generation hardware circuitry;

FIGS. 3a–3c constitute a flow diagram for the $L_1$, $L_2$ frequency multiplexing;

FIGS. 4a and 4b constitute a flow diagram for the space vehicle multiplexing;

RECEIVER ANTENNA/PREAMPLIFIER AND $L_1/L_2$ MULTIPLEXING

Figure 1A:
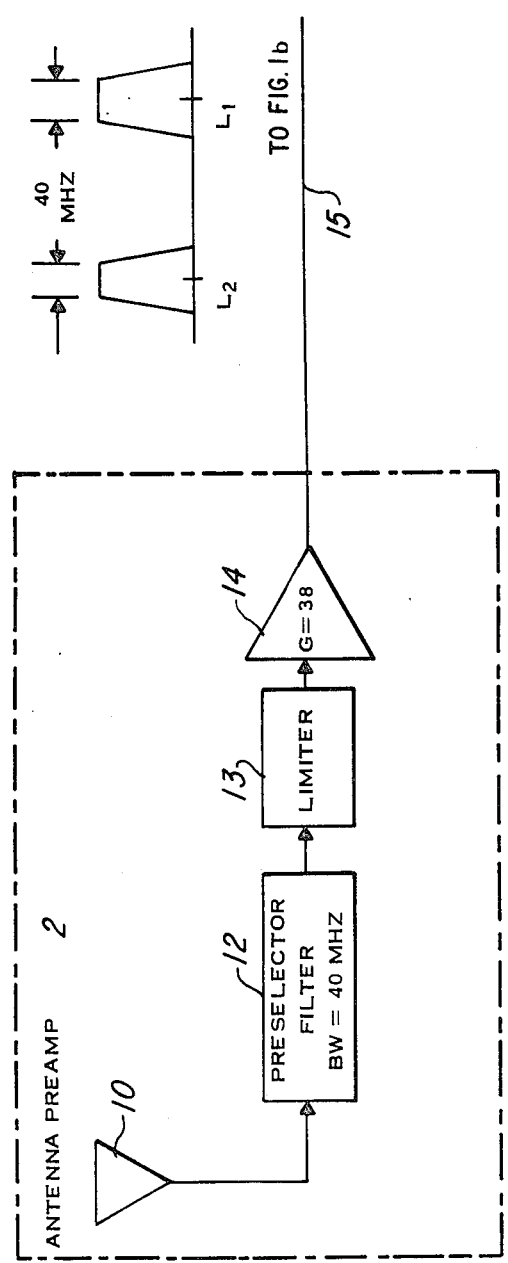

Referring now to the drawings, the global position system (GPS) receiver comprises an antenna/preamplifier 2 having an antenna 10 (FIG. 1a) for receiving RF ($L_1$ and $L_2$) signals from orbiting space vehicles (SV). Each orbiting space vehicle has an identification code and two transmitters. One transmitter sends the code at a preselected high ($L_1$) frequency and the other transmitter sends the code at a preselected low frequency ($L_2$). The $L_1$ and $L_2$ frequencies are the same for each of the space vehicles. A bandpass filter 12 is connected to the antenna for removing signals having frequencies outside the frequency range of the space vehicle's RF signals. A preamplifier 14 is connected to the filter 12 to amplify the RF signals to a working level. A limiter 13 may be connected between filter 12 and amplifier 14 to protect the preamplifier from stray interferers of strong amplitude. The output of the amplifier 14 is two center frequencies ($L_1$ and $L_2$) of about 1200 MHz and 1600 MHz each having 40 MHz bandwidths.

Figure 1B:
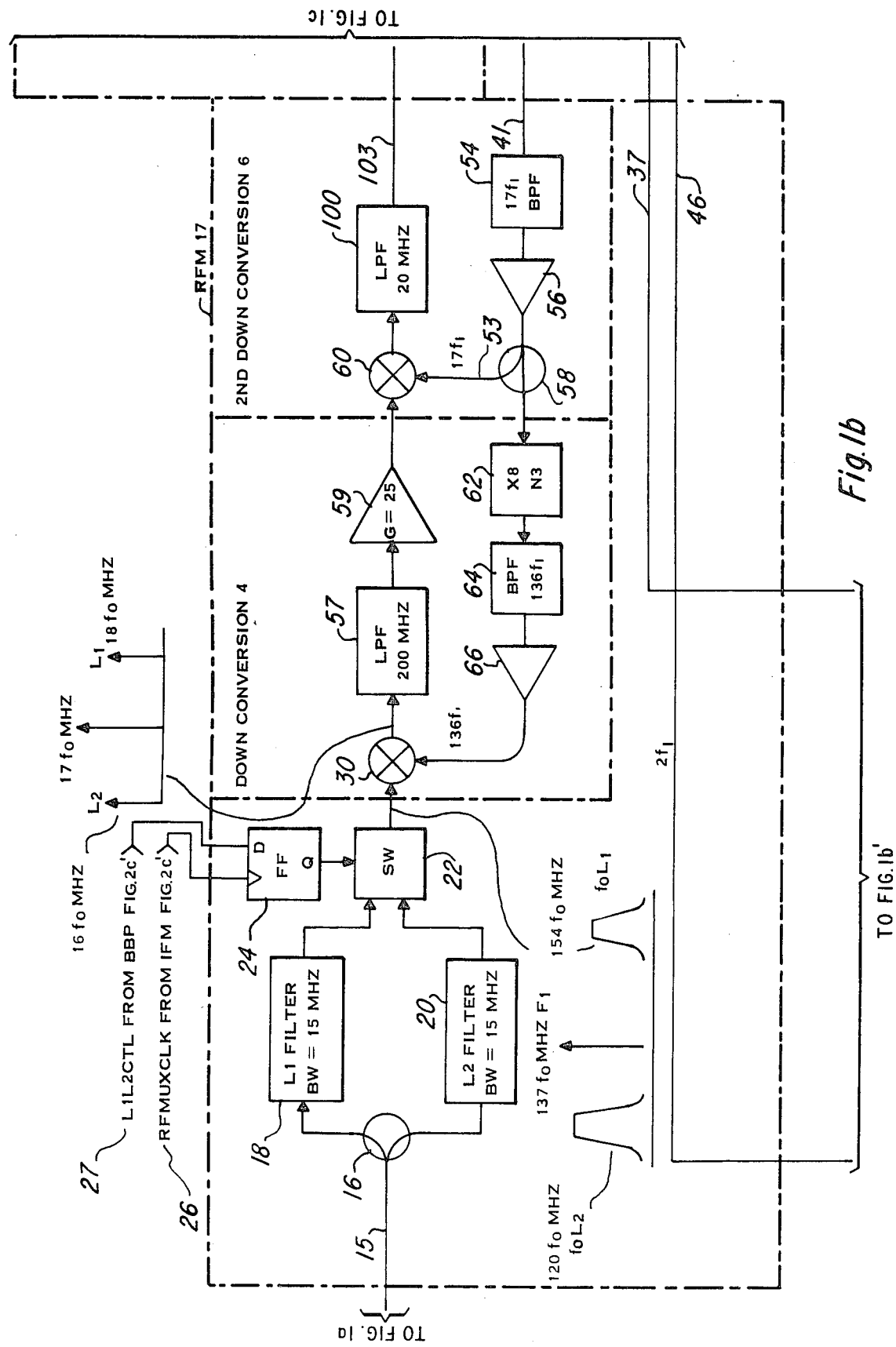
Figure 1B:
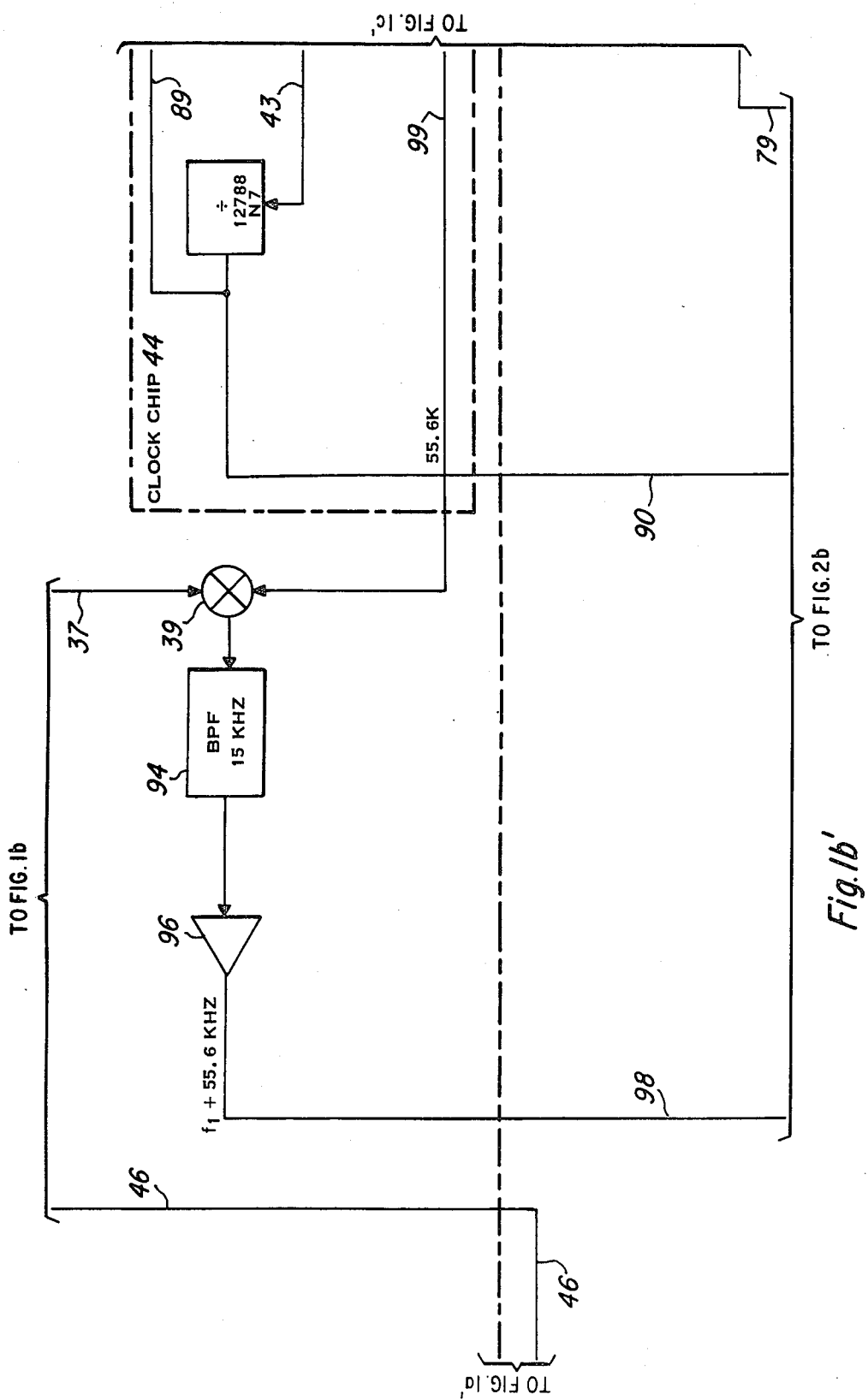
Figure 2B:
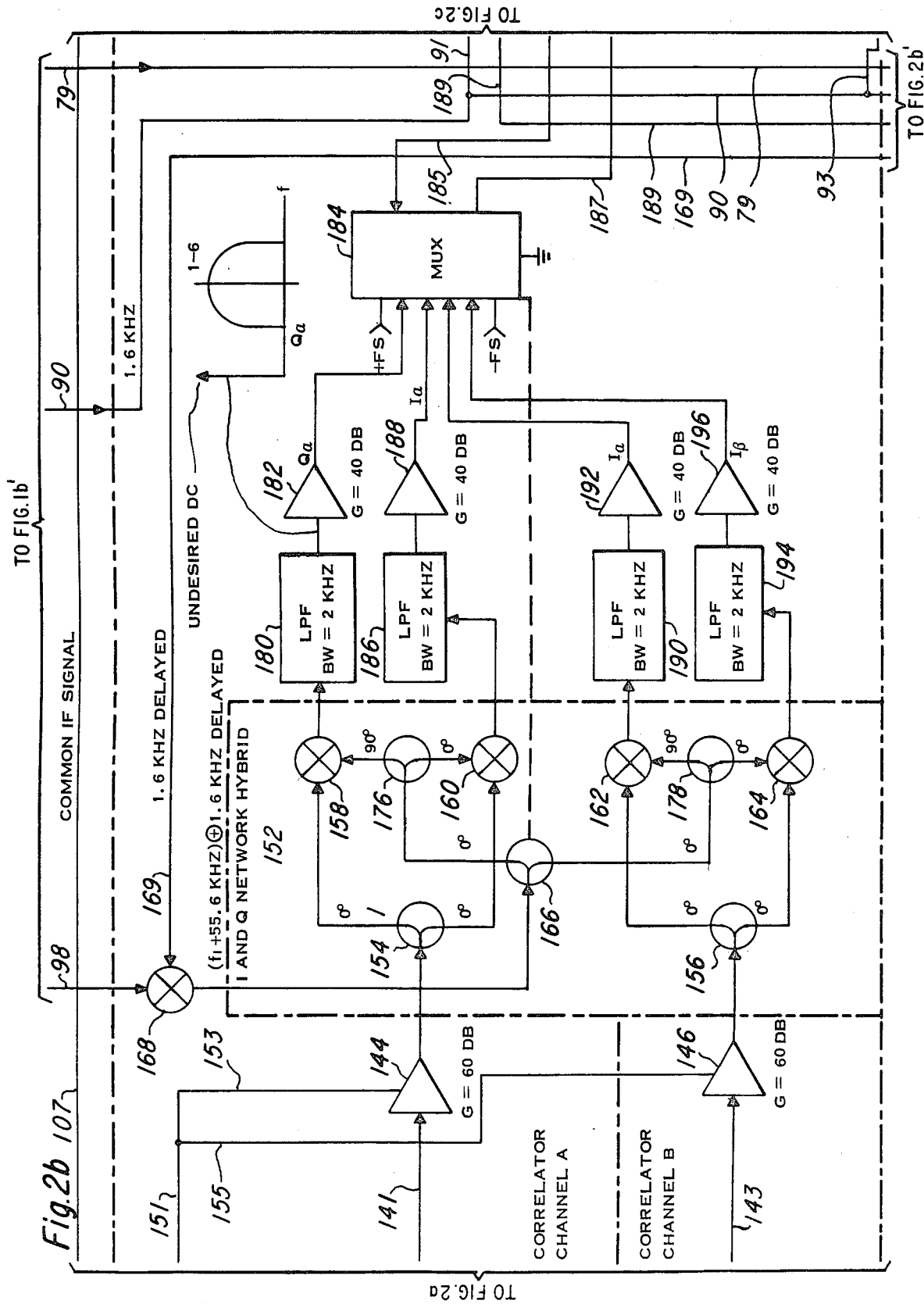
Figure 2B:
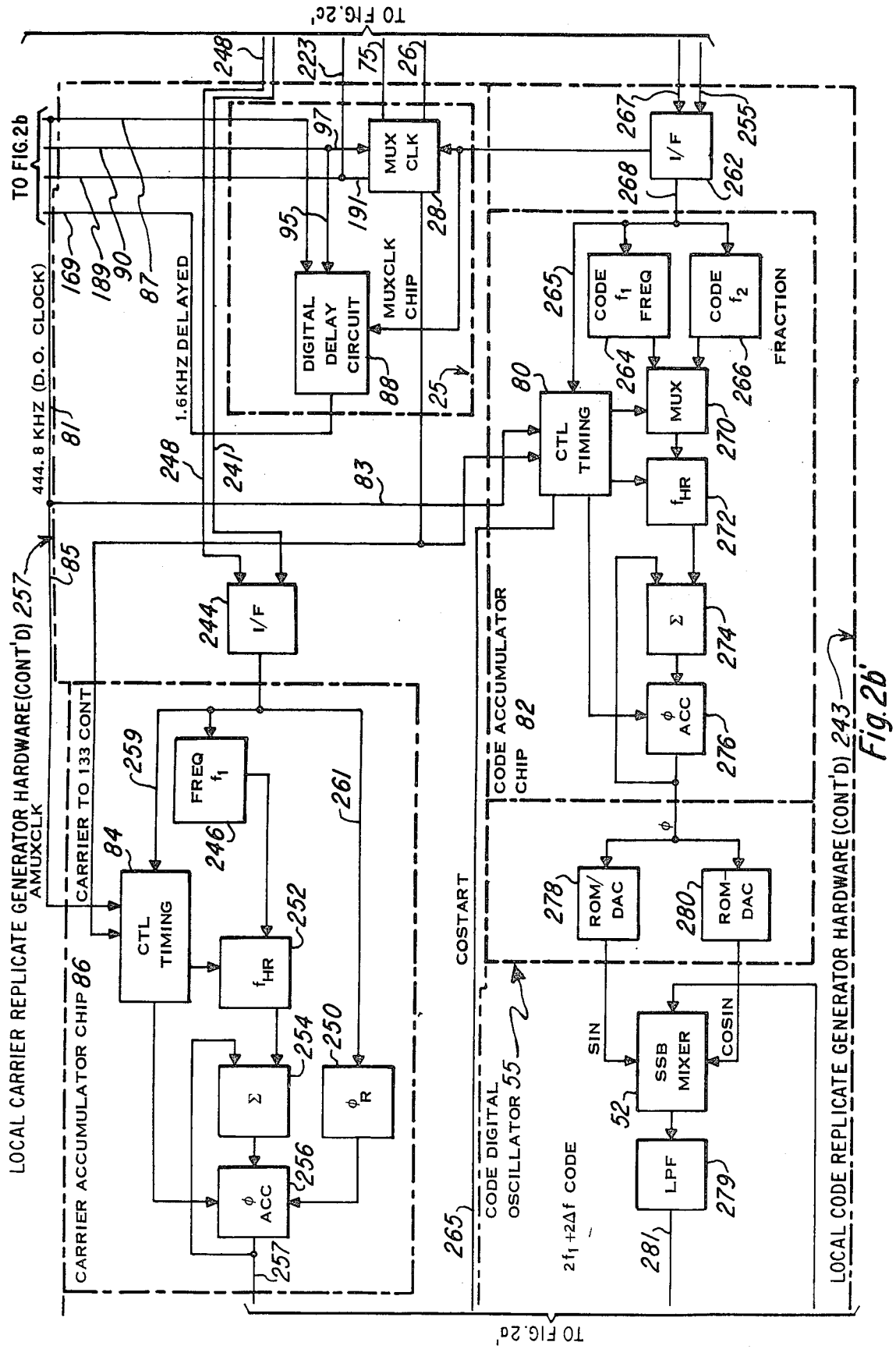
Figure 2C:
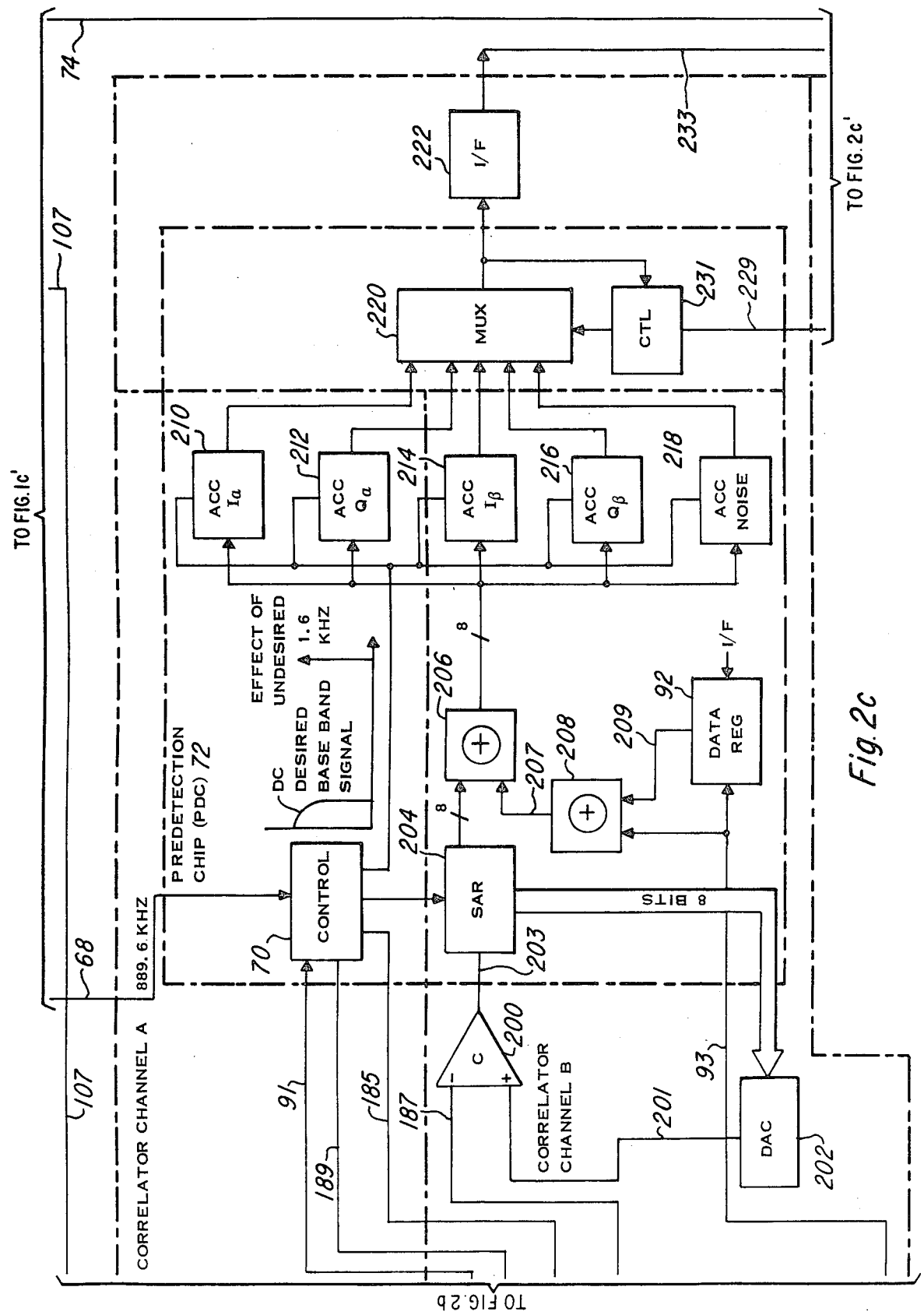
Figure 2C:
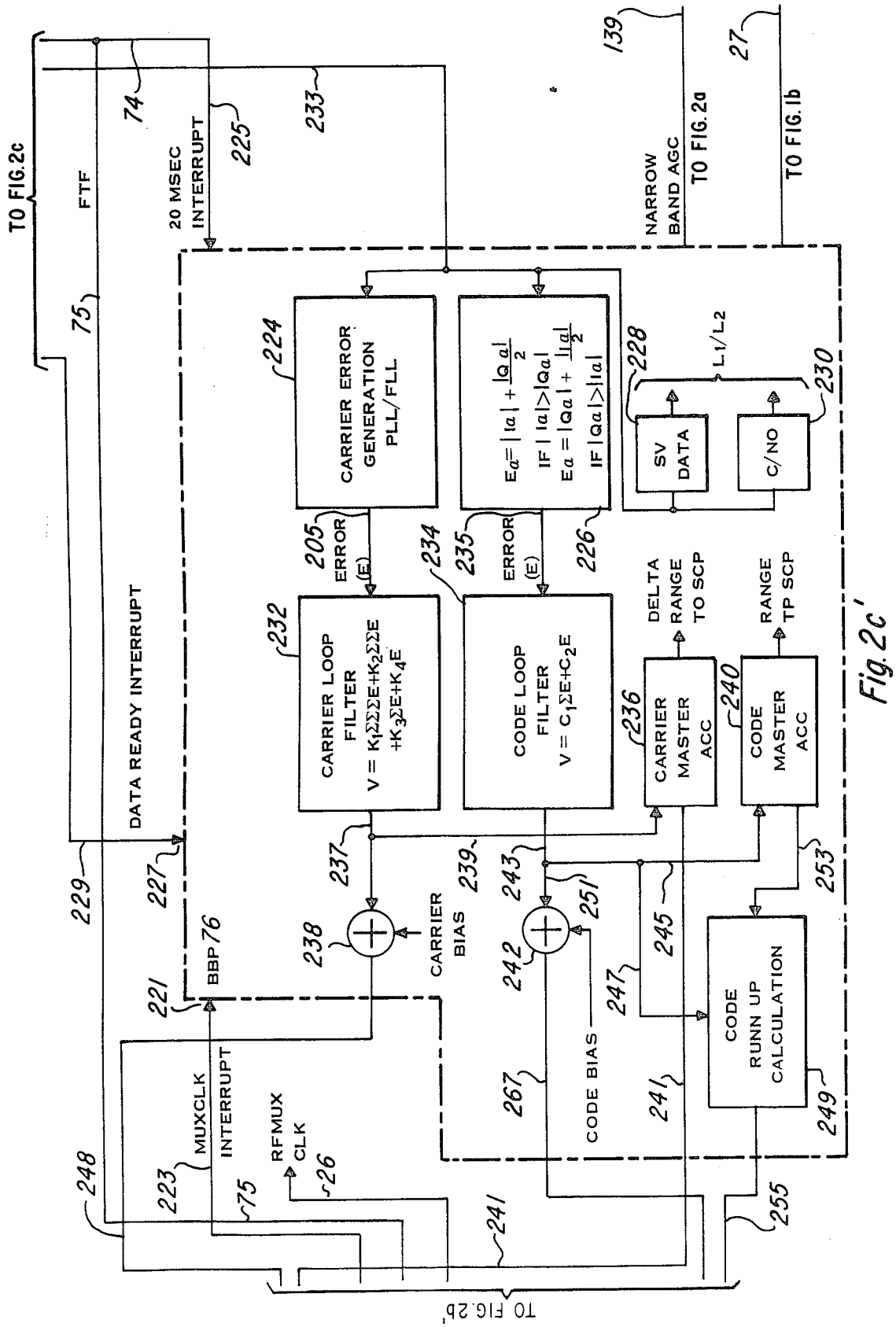

The amplifier 14 (FIG. 1a) has its output connected by lead 15 to a diplexer 16 (FIG. 1b) of a two stage down conversion RF module 17. Diplexer 16 has an output connected to the frequency ($L_1$) bandpass filter 18 and an output connected to frequency ($L_2$) bandpass filter 20. Filters 18 and 20 limit the frequencies received to those of the space vehicles being tracked. The outputs of the $L_1$ and $L_2$ frequency filters 18 and 20 [a 137 MHz $f_1$ and 154 MHz $f_0$ ($L_1$) and 120 MHz $f_0$ ($L_2$)] are connected to a switch 22 which is controlled by a flip flop 24. Flip flop 24 has its clock terminal connected by lead 26 to an RF multiplexer clock 28 (FIG. 2b') of multiplexer integrated circuit (IC) chip 25 and its data in terminal (FIG. 1b) connected by lead 27 to the $L_1$, $L_2$ frequency control signals of the baseband processor 76 (FIG. 2c'). The $L_1$ and $L_2$ processor signals alert the switch 22 (FIG. 1b) which then switches precisely with the clock signal. The flip flop 24 controls the switch 22 to admit alternately the $L_1$ and $L_2$ coded frequency signals to a first stage mixer 30 of the first stage 4 of the two stage down conversion RF module 17. The output of mixer 30 is either the $L_1$ or $L_2$ signals. For example, the $L_1$ frequency (154 $f_0$) may be admitted for a 10 milliseconds period and then the $L_2$ frequency (120 $f_0$) is admitted for 10 milliseconds or vice versa. As the local oscillators (LO) are part of the frequency and clocking system, the frequency and clocking system will now be described. The coherent and coordinated synthesis of frequencies and timing are critical to the successful implementation of the multiplex concept.

COHERENT TIME AND FREQUENCY SYNTHESIS

A master oscillator 32 (FIG. 1c) provides a first frequency signal ($f_1 = 10.2304$ MHz) to an amplifier 34. Amplifier 34 has its output connected by leads 29, 31 and 33 to $N_1$ ($\times 17$) multiplier 36 and by leads 29 and 35 to $N_2$ ($\times 2$) multiplier 38 (FIG. 1c) and by leads 29, 31 and 37 to a mixer 39 (FIG. 1b'). The multiply by $N_2$ ($\times 2$) multiplier 38 (FIG. 1c) has its output ($2f_1$) amplified in amplifier 40 and applied to a power divider 42. Power divider 42 has one $2f_1$ output connected by lead 43 to an integrated circuit (IC) clock chip 44 (FIGS. 1b' and 1c'), and a second $2f_1$ output connected by lead 46 to a second power divider 48 (FIG. 2a'). Power divider 48 has one $2f_1$ output connected by lead 49 to the clock terminal of a single side band mixer or resolver 50 in a local carrier replicate generation hardware circuit and a second $2f_1$ output connected by lead 51 to the clock terminal of a second resolver 52 (FIG. 2b') in a local code replicate generation hardware circuit.

Returning to Fig. 1c, the multiply by $N_1(\times 17)$ multiplier 36 (FIG. 1c) is connected by lead 41 in turn to a bandpass filter 54 (FIG. 1b), amplifier 56 and power divider 58. Power divider 58 has one $17f_1$ output connected by lead 53 as (LO) to a second stage mixer 60 of the second stage 6 of two stage down conversion RF module 17, and a second $17f_1$ output connected to $N_3(\times 8)$ multiplier 62. The multiply by $N_3$ multiplier 62 has its $136f_1$ output filtered by bandpass filter 64, amplified in amplifier 66 and connected as LO to the first stage mixer 30.

Figure 1C:
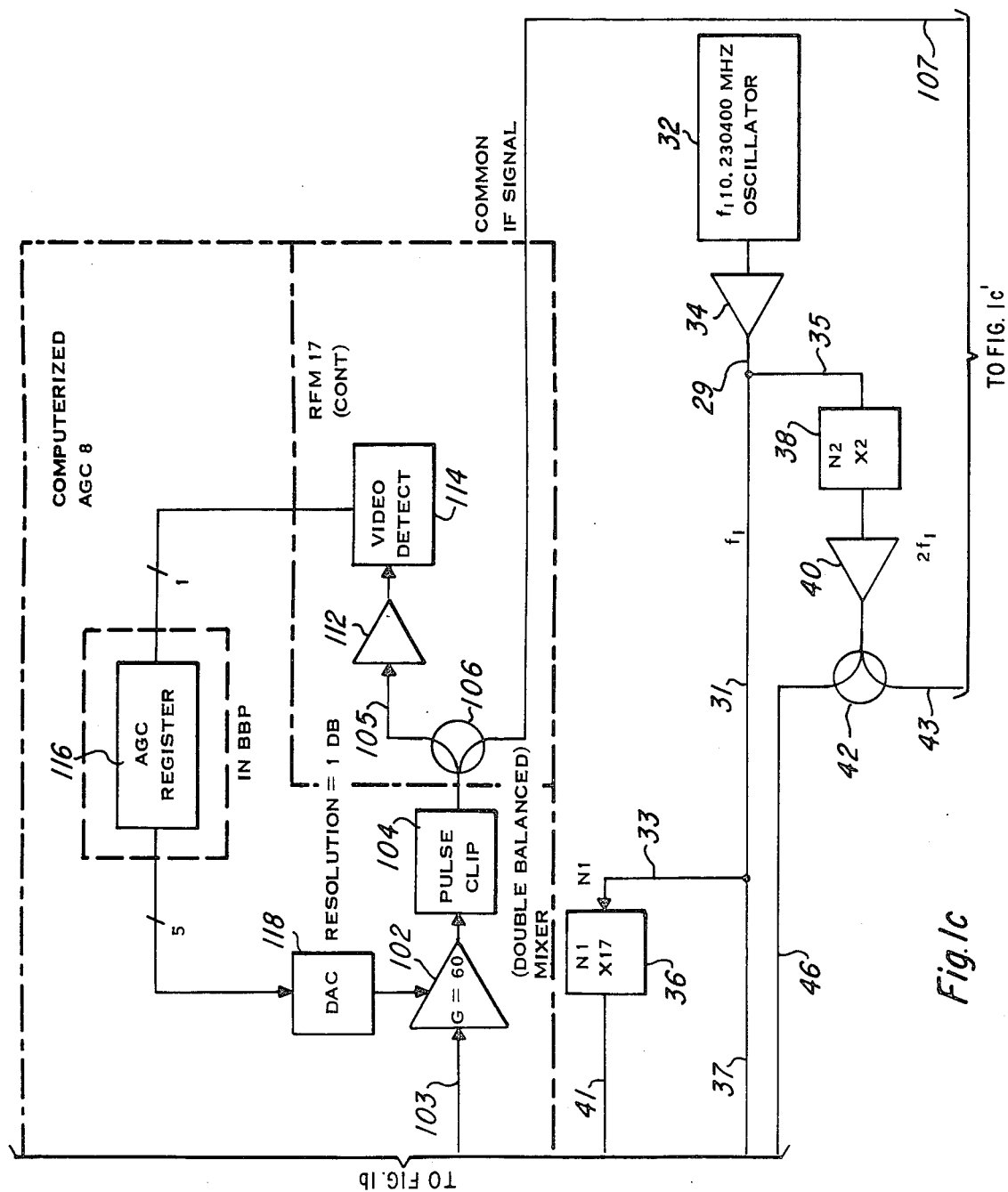

The IC clock chip 44 (FIGS. 1b' and 1c') includes $N_4$, $N_5$, $N_6$, $N_7$ and $N_8$ dividers connected by lead 43 to power divider 42 (FIG. 1c). The divide by $N_4$ (divide by 23, 889.6 KHz) (FIG. 1c') is connected by lead 68 to the $N_6$ and $N_8$ dividers of the clock chip 44 and to a control 70 (FIG. 2c) of a predetection IC chip 72. The $N_5$ divider (divide by 32, 50 Hz) (FIG. 1c') has an input connected by lead 89 to the output of the $N_7$ (divide by 12788) divider (FIG. 1b') and an output (50 Hz), which is a fundamental time frame signal, connected by lead 74 to the 20 millisecond interrupt terminal of baseband processor 76 (FIG. 2c') and by leads 74 and 75 to multiplexer clock 28 (FIG. 2b'). The fundamental time frame signal represents an immutable system reference timing which regularly interrupts the baseband processor 76. The $N_6$ divider (divide by 2, 444.8 KHz) (FIG. 1c') is connected by leads 79, 81 and 83 to clock a control timing circuit 80 (FIG. 2b') of code accumulator IC chip 82, and by leads 79, 81 and 85 to control timing circuit 84 of carrier accumulator IC chip 86, and by leads 79 and 87 to a digital delay circuit 88 (FIG. 2b'). The $N_7$ divider (divide by 12788, 1.6 KHz) (FIG. 1b') is connected by leads 90 and 91 to control 70 of the predetection IC chip 72 (FIG. 2c) and by leads 90 and 93 to data register 92 of predetection IC chip 72 (FIG. 2c); and by leads 90 and 95 to digital delay circuit 88 (FIG. 2b'); and by leads 90 and 97 to multiplexer clock 28 (FIG. 2b'). The $N_8$ (divide by 16, 55.6 KHz) divider (FIG. 1c') is connected by lead 99 to mixer 39 (FIG. 1b') where it is mixed with the $f_1$ frequency. Mixer 39 has its output ($f_1 + 55.6$ KHz) filtered in filter 94, amplified in amplifier 96 and connected by lead 98 to a mixer 168 (FIG. 2b) for the I and Q network hybrid 152.

RF MODULE

Returning now to the mixer 30 of the first RF down conversion stage (FIG. 1b), the output of mixer 30 which alternately includes $L_1$ (18 MHz) and $L_2$ (16 MHz), and $f_1$ (17 MHz) is filtered in low pass filter 57 amplified by amplifier 59 and connected to second stage mixer 60. The output of second stage mixer 60, which is a common IF signal ($L_1$ or $L_2$ signals for all SVs), is filtered in filter 100. Filter 100 is connected by lead 103 to automatic gain control (AGC) amplifier 102 (FIG. 1c) where it is amplified and connected to a pulse clip circuit 104 (FIG. 1c). Pulse clip circuit 104 clips the amplitude of any interference signals such as those generated by local radar operation. The output of pulse clip circuit 104 is connected to a power divider 106. The power divider 106 has one output connected by lead 105 to amplifier 112 of the wideband automatic gain control circuit, and a second output connected by lead 107 to a low pass filter 108 (FIG. 2a) of an IF module 110. The amplifier 112 (FIG. 1c) is connected to video detector 114. Video detector 114 detects the signal amplitude envelope. Whether this value is above or below a threshold is sent in one bit outputs to the processor 76 (FIG. 2c). While the AGC register 116 is a part of the baseband processor 76 (FIG. 2c') for ease of description it is broken out of the processor 76 and included in the circuit of the computerized AGCB (FIG. 1c). The processor uses this to adjust the value of an AGC register 116. The AGC register represents the AGC voltage which when needed is applied to a digital to analog converter (DAC) 118. The output of the DAC 118 is connected to the AGC amplifier 102 for maintaining a constant voltage output.

IF MODULE

Referring to FIG. 2a, the common IF signal ($L_1$ or $L_2$) is filtered in the low bandpass filter 108 (FIG. 2a) to remove any spurious frequencies and applied to mixer 120. Mixer 120 is connected by lead 121 to output selector 122 of the code chip carrier 123 (FIG. 2a'). In the mixer 120 the common IF signal is mixed with a local random noise code called T code output from output selector 122 for the p-(precision) code and ca (coarse acquisition) code generators 124 and 126 in the code loop. The common IF signal and T code signal from mixer 120 (FIG. 2a) is amplified in amplifier 128 and connected to mixer 130. Mixer 130 is connected by lead 129 to low pass filter 132 (FIG. 2a'). Mixer 130 mixes the common IF signal and T code signal with a synthesized Doppler frequency output of filter 132 which is connected to the sum frequency output of the resolver 50 which in turn is connected to a carrier digital oscillator 133 (FIGS. 2a', 2b') in a local carrier replicate generation hardware circuit. Mixer 130 (FIG. 2a) utilizes the synthesized Doppler output of resolver 50 to strip the Doppler from the common IF and T code signal.

CORRELATOR CHANNELS A AND B

The output of mixer 130 is connected to a power divider 134 of a dual mixer hybrid. Power divider 134 has its outputs connected to mixers 136 and 138 for code wipeoff. Mixer 136 is connected by lead 135 to the output selector 122 (FIG. 2a') of correlator channels alpha, beta, of the code chip carrier 123. Mixer 136 (FIG. 2a) mixes the common IF signal and T code signal with a synthesized early/late code alpha exclusive ORed with the T code signal received from output selector 122 to form a "tau-dither" code mixing signal and is allocated to the code tracking loop. Mixer 138 is connected by lead 137 to the output selector 122 (FIG. 2a') of the code chip carrier 123. Mixer 138 (FIG. 2a) mixes the common IF signal and T code with a synthesized prompt p code beta exclusive ORed with the T code signal received from output selector 122. The mixers 136 and 138 strip off the codes from the common IF signals from which the carrier and code errors will be derived. The outputs of mixers 136 and 138 are, respectively, filtered in bandpass filters 140 and 142 and connected by leads 141 and 143 to narrow band AGC amplifiers 144 and 146 (FIG. 2b).

The narrow band automatic gain control voltage, which is digitally adjusted based on rms signal is received from baseband processor 76 (FIG. 2c') through lead 139 (FIG. 2a) and is applied to the AGC amplifiers through interface 148 (FIG. 2a) and latch digital to analog converter (DAC) 150. Latch DAC 150 holds the AGC control voltage from the baseband processor until changed by the baseband processor at which time it is connected by leads 151 and 153 to AGC amplifier 144 (FIG. 2b) and by leads 151 and 155 to AGC amplifier 146. The outputs of AGC amplifiers 144 and 146 (FIG. 2b) are connected to an I and Q network hybrid 152 for forming and bandlimiting basebands in phase (I) and quadrature (Q) signals.

The I and Q network hybrid 152 includes power dividers 154 and 156 connected, respectively, to the outputs of AGC amplifiers 144 and 146. Power divider 154 provides in phase signals to mixers 158 and 160; while power divider 156 provides in phase signals to mixers 162 and 164. The I and Q network hybrid includes a third power divider 166 connected to the output of mixer 168. Mixer 168 is connected by lead 98 to the $f_1 + 55.6$ clock output of mixer 39 (FIG. 1b') and by lead 169 to digital delay circuit 88 (FIG. 2b'). Mixer 168 provides a local oscillator frequency ($f_1 + 55.6$ KHz) and an exclusive OR delayed frequency (1.6 KHz) to the power divider 166. The delayed frequency (1.6 KHz) is to remove any dc effect from the mixers 158, 160, 162 and 164.

The output of power divider 166 is connected in phase to quadrature dividers 176 and 178. Quadrature divider 176 provides a quadrature frequency to mixer 158 and an in phase signal to mixer 160; while diplexer 178 provides a quadrature frequency to mixer 162 and an in phase signal to mixer 164. The output ($Q_\alpha$) (see FIG. 2b) of mixer 158 is filtered in low pass filter 180, amplified in amplifier 182 and connected to a signal multiplexer 184; while the output ($I_\alpha$) of mixer 160 is filtered in low pass filter 186, amplified in amplifier 188 and applied to signal multiplexer 184. The output ($Q_\beta$) of mixer 162 is filtered in low pass filter 190, amplified in amplifier 192 and applied to signal multiplexer 184; while the output ($I_\beta$) of mixer 164 is filtered in low pass filter 194, amplified in amplifier 196 and applied to signal multiplexer 184.

The multiplexer 184 (FIG. 2b) is connected by lead 185 to controller 70 (FIG. 2c). The controller 70 is connected by leads 189 and 191 to clock 28 (FIG. 2b'). The multiplexer 184 (FIG. 2b) in response to control 70 samples the $Q_\alpha$, $I_\alpha$, $Q_\beta$, and $I_\beta$ outputs at a preselected frequency for predetection. The predetection circuit performs analog-to-digital conversion of the four I and Q signals with time and phase controllable digital integrate-and-dump circuits as follows. The sampled signals are connected by lead 187 to a comparator 200 (FIG. 2c). Comparator 200 is connected by lead 201 to DAC 202. Comparator 200 compares the sampled signals with an analog output of the digital to analog converter 202 to determine their voltage level. The output of comparator 200 is connected by lead 203 to a successive approximation register (SAR) 204 of predetection IC chip 72. The register 204 provides an 8 bit word to an exclusive OR gate 206 and to the digital to analog converter 202. Exclusive OR gate 206 is connected by lead 207 to the output of a second exclusive OR gate 208 whose inputs are connected to a data register 92 by lead 209 and to clock IC chip 44 (FIG. 1b) by lead 93, and 90 (FIGS. 2c, 2b, and 1b). The data register 92 can be used in special applications to remove the satellite data. The 1.6 KHz dc bias removal code is applied to the signal path via exclusive OR gates 208 and 206 (FIG. 2c). The output of exclusive OR gate 206 at this point has been down converted to baseband and is an 8 bit word connected to accumulators 210, 212, 214, 216 and 218. The accumulators integrate and dump the $I_\alpha$, $Q_\alpha$, $I_\beta$, $Q_\beta$ and noise signals into a multiplexer 220. Multiplexer 220 multiplexes the accumulators 210–218 I and Q data words into a computer interface 222. The interface 222 consists of a plurality of latches (not shown) which holds the data word until called for by the baseband processor 76.

A multiplex clock signal determines when the receiver dwells on given SV signals. This multiplex clock signal is generated as an output of the MUX clock circuit 28 (FIG. 2b'). Phase control of the multiplex clock signal is in discrete 625 microseconds steps called multiplex increments (MINCS) derived from $f_1$ divided by 6394 (1600 Hz). The phase is chosen and updated from time to time, in accordance with the timing of data bit edges of the SV signals currently being received. The periodicity of the multiplex clock is also determined by MUX clock circuit 28. This periodicity is normally selected to be an integer power of two multiple of one MINC. Thus the multiplex clock signal is stable in its phase relationship with respect to system timing FTF (Frequency Time Frame), until such times as the system may update this timing or phase relationship in increments of one MINC as the SV data bit times drift with respect to receive-timing.

BASEBAND PROCESSOR

The baseband processor 76 (FIG. 2c') has its MUX clock interrupt terminal 221 connected by leads 223 and 191 to MUX clock 28 (FIG. 2b'). The MUX clock determines when the receiver dwells on given satellite signals. The processor's DATA READY INTERRUPT terminal 227 (FIG. 2c') is connected by lead 229 to CTL 231 (FIG. 2c) of the predetection integrated circuit chip 72. Processor commands are synchronized by the multiplex timing. The processor is notified by the DATA READY INTERRUPT when new integrated I and Q data are available and by MUX interrupt when a multiplexer dwell interval has been completed.

The baseband processor interface 222 (FIG. 2c) output is connected by lead 233 to the baseband processor's carrier error generator 224, code error generator 226 for envelope detection, space vehicle data 228 and carrier to noise ratio determining circuit 230. The SV data and C/NO data are output to an external supervisory controller (not shown) which monitors the operation of the GPS receiver. This may be the same processor as the baseband processor in some applications. To eliminate the need for a code and carrier loop for each space vehicle, the processor software duplicates for each space vehicle being tracked code and carrier loop/filter states, code and carrier master accumulator states and narrow band AGC states. Computer code (algorithm) is not duplicated for multiple SVs.

The carrier error generator 224 is connected by lead 205 to a carrier loop filter 232, and the code error generator 226 is connected by lead 235 to a code loop filter 234. The carrier loop filter 232 output is connected by leads 307 and 239 to carrier master accumulator 236 and by lead 237 to summer 238. The accumulator 236 is an integrator which converts carrier frequency information to carrier phase information. One output of the carrier master accumulator is connected by lead 241 to the interface 244 (FIG. 2b') of the carrier digital oscillator to control its initial phase. The other output of the carrier accumulator 236 (FIG. 2c') is used for computing the delta range (for range rate measurement).

The code loop filter 234 frequency word output is connected by leads 243 and 245 to code master accumulator 240, by leads 243 and 247 to a code runup calculation 249, and by leads 243 and 251 to a summer 242. The frequency output of the code loop filter 234 is accumulated in code master accumulator 240. The accumulator integrates the code frequency to provide a code phase state. The code master accumulator is used to compute the pseudo range measurement output of the receiver. The code master accumulator 240 is connected by lead 253 to the code runup calculation 249. The code runup calculation is directed by lead 255 to the interface 262 (FIG. 2b') of the code digital oscillator 55 to enable smooth setting of the code phase state, without skipping code clock cycles.

LOCAL CARRIER REPLICATE GENERATION HARDWARE

Returning to FIG. 2c' to complete the local carrier replicate generation hardware 257 or the carrier loop, summer 238 is also connected to the carrier $(L_1)$, $(L_2)$ biased (fixed frequency offset) output and has its output, which is a Doppler frequency word (F word), connected by lead 248 to interface 244 (FIG. 2b') with the carrier accumulator IC chip 86. The F words are sent by the baseband processor in discrete update intervals that are concurrent with the baseband predetection sample data intervals. The interface 244 is a buffer which enables the carrier accumulator hardware to set the carrier error frequency and phase into the carrier digital oscillator 133 of the carrier loop.

The interface 244 is connected to the digital oscillator 133 as follows: by lead 259 to the CTL timing clock 84, a carrier frequency latch 246 for holding the carrier frequency, and by lead 261 to a phase latch 250. The carrier frequencies are synchronized under precise clock control derived from N4 divide by 23 and N6 divide by 2 or 444.8 KHz output of the clock chip 44 (FIGS. 1b' and 1c'). Latch 246 (FIG. 2b') inputs the carrier F Word into a holding register 252 in response to the clock output of timing clock 84. The holding register 252 is connected to timing clock 84. The holding register 252 is connected to a summer 254. Summer 254 is connected to a phase accumulator 256 which is also connected to phase latch 250. The carrier F Word is an ultra high resolution (32 bit) variable phase angle increment that is added and accumulated on each digital oscillator clock epoch.

The phase accumulator 256 is connected by lead 257 to ROM/DACs 258 and 260 (FIG. 2a'). The upper 8 bits (Digital angles) of the digital oscillator phase accumulator 256 (FIG. 2b') are converted to digital amplitude by table look up from two hundred and fifty six sine and cosine amplitudes stored in ROMs 258 and 260 (FIG. 2a') and addressed by the 8 bit phase angles. The output of phase accumulator 256 (FIG. 2b') is also fed back to the summer 254 to allow incrementing (accumulation) of the phase value by the carrier F Word. The phase accumulator is connected by lead 257 to ROM/DACs 258 and 260 (FIG. 2a'). The analog output of ROM/DACs 258 and 260 are combined in resolver 50 with the two $f_1$ reference frequency received through lead 49 connected to frequency power divider 48, above described. The resolver 50 is connected to filter 132 and by lead 129 to mixer 130 (FIG. 2a) to provide the two $f_1$ plus delta f carrier for carrier wipe off in the mixer 130 and the carrier loop is completed.

To time share the carrier digital oscillator in multiplex operation, the baseband processor provides carrier frequency in phase state retention memory for each SV being tracked. The 32 bit digital oscillator carrier phase preset register 252 permits the digital oscillator's phase accumulator to be set instantly to the phase of the next SV. This is crucial to the SV multiplex operation. The frequency control register is then updated to the next SV Doppler frequency.

LOCAL CODE REPLICATE GENERATION HARDWARE

Returning now to FIG. 2c' to complete the local code replicate generation hardware 243 or code loop, summer 242 has as inputs the output of code loop filter 234 and a fixed code frequency offset. The fixed code frequency offset is provided from the bandpass processor's memory. The output of summer 242 (FIG. 2c') is connected by lead 267 to buffer interface 262 (FIG. 2b') for the code digital oscillator 55. Interface 262 is connected by lead 268 to latches 264 and 266 and CTL timing clock 80. Latches 264 and 266 are connected to a multiplexer 270 which alternately inputs the code F Word from latch 264 and the code runup word from latch 266 into a holding register 272 in response to the clock output of timing clock 80. A summer 274 is connected to the frequency holding register 272 and to a phase accumulator 276. The output of phase accumulator 276 is fed back to summer 274 to allow incrementing (accumulation) of the phase value by the code F Word. The output of code phase accumulator 276 is connected to ROM/DACs 278 and 280 of code digital oscillator 55. The ROM/DACs 278 and 280 convert the phase outputs of the phase accumulator 276 to analog amplitudes. ROM/DACs 278 and 280 are connected to resolver 52 where their outputs are mixed with the $2f_1$ reference. The output of the resolver 52 ($2f_1 + 2$ delta $f_{code}$) is filtered in filter 279 and connected by lead 281 to a code timing device 284 (FIG. 2a'). Code timer 284 which divides the clock frequency by two is connected by leads 283 and 285, respectively, to clock terminals for the p(precision) code and ca (coarse acquisition)—code generators 124 and 126 and by lead 289 to a code setter 288. The code setter 288 is, for example, a code setter's circuit number 2528400 sold by Texas Instruments Incorporated. The code setter 288 is connected to the p-code generator 124 and to the ca code generator 126. The code setter 288 synchronizes the p-code generator and the ca-code generator and pursuant to the software selection of the space vehicle sets instantaneously the SV code identification for detection of the selected space vehicle. This instantaneous setting is essential to the SV multiplexing operation.

The code generators 124 and 126 (FIG. 2a') are those described in Rockwell International Corporation Space Division's Nov. 18, 1975 Document Number MH08-00002400 (Rev. E) entitled "Space Vehicle Nav System and NTS TRN Navigation Assembly/User System Segment and Monitor Station." P-Code Generator 124 and ca-Code generator 126 are connected to the output selector 122. The output selector 122 as previously described is connected by leads 121, 135, and 137, respectively, to the above described mixers 120, 130, and 138 which completes the code loop.

To provide rapid and precise code integer chip setting (a chip is an element of the SV code, 100 nanoseconds for the P-code), and precise code fractional chip setting for multiplexed local replica codes, the base band processor 76 (FIG. 2c') provides the code state retention memory for each SV being tracked. The code master accumulator provides this code state retention. The code setter 288 (FIG. 2a') and code timing circuit 284 which are synchronized by multiplex timing control of the code digital oscillator 55 (FIG. 2b') provide the rapid code integer setting, using the information in the integer-chip portion of the code master accumulator. The information for the desired fractional chip (i.e. code clock phase) setting of the code is provided by the fractional-chip portion of the code master accumulator. The manifestation in hardware of this desired code clock phase is effected as an automatic two step process. The first step precedes the MUX INTERRUPT (FIGS. 2b' and 2c') event by a few microseconds and is called code feathering. The second step commences at MUX INTERRUPT, completes in a few microseconds and is called code runup.

Code feathering is a reset to zero of the code phase accumulator 276 (FIG. 2b') and summer 274 to establish through the code digital oscillator a code reference phase condition for the code setter 288 (FIG. 2a). The feathering is done early enough before the code integer state is set to allow the code Doppler frequency phase to settle to zero. Note that at this time the code setter setup words are loaded into the code setter without risk of clock edge uncertainties.

Code runup is provided by the combination of the 32 bit code fraction register 266 (FIG. 2b') and the code frequency register 264. Before MUX INTERRUPT occurs, the fraction register must contain an F word that, when applied to the digital oscillator for a precise runup time interval of 80 microseconds, will advance the integer code state to the real code state required. Likewise the frequency register must contain the code F word corresponding to the code Doppler for the forthcoming sample interval. The code digital oscillator hardware controls feathering, set, runup, and steady state frequency synthesis execution across the MUX interrupt boundary.

SPACE VEHICLE MULTIPLEXING

Figure 4A:
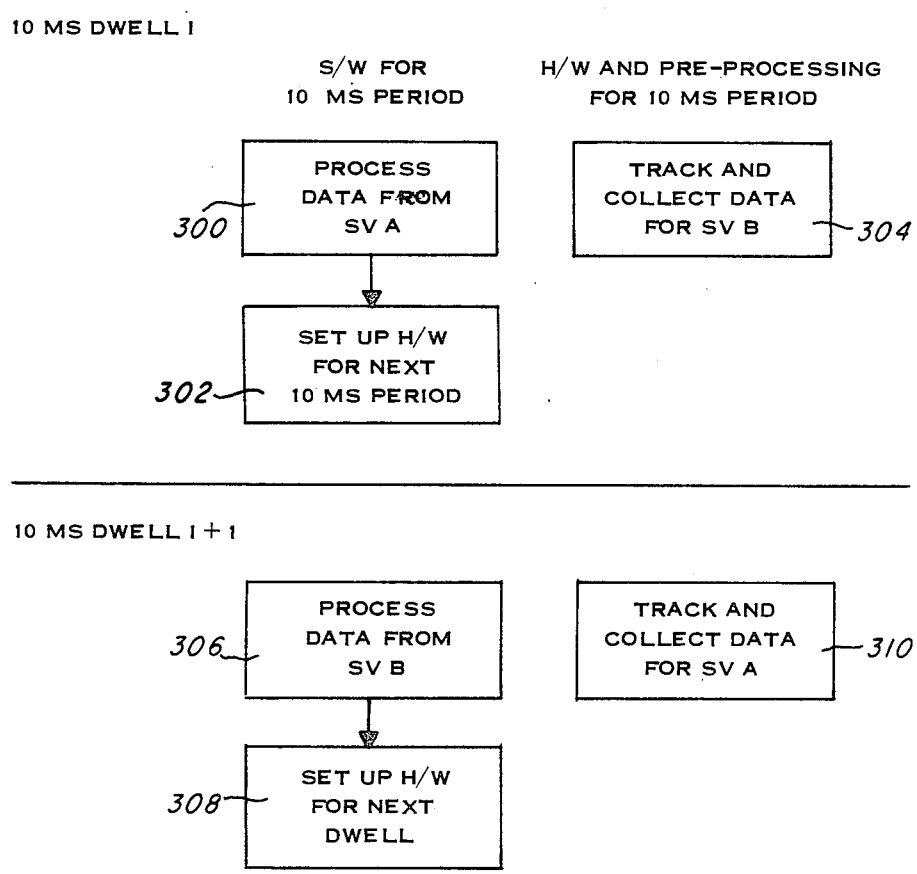

Referring now to FIG. 4a in which is shown a flow diagram for space vehicle multiplexing, during the first dwell period (i) which is, for example, 10 msec. the base band processor 76 (FIG. 2c') processes (300) (FIG. 4a) data from space vehicle A and then sets up (302) the hardware for the next 10 msec. period. During the first period (300), the hardware is tracking and collecting data (304) for space vehicle B. Then during the next dwell period (i+1) the baseband processor processes data (306) from space vehicle B and sets up (308) hardware for the next dwell. During this dwell period, the software is tracking and collecting data (310) for space vehicle A.

Figure 4B:
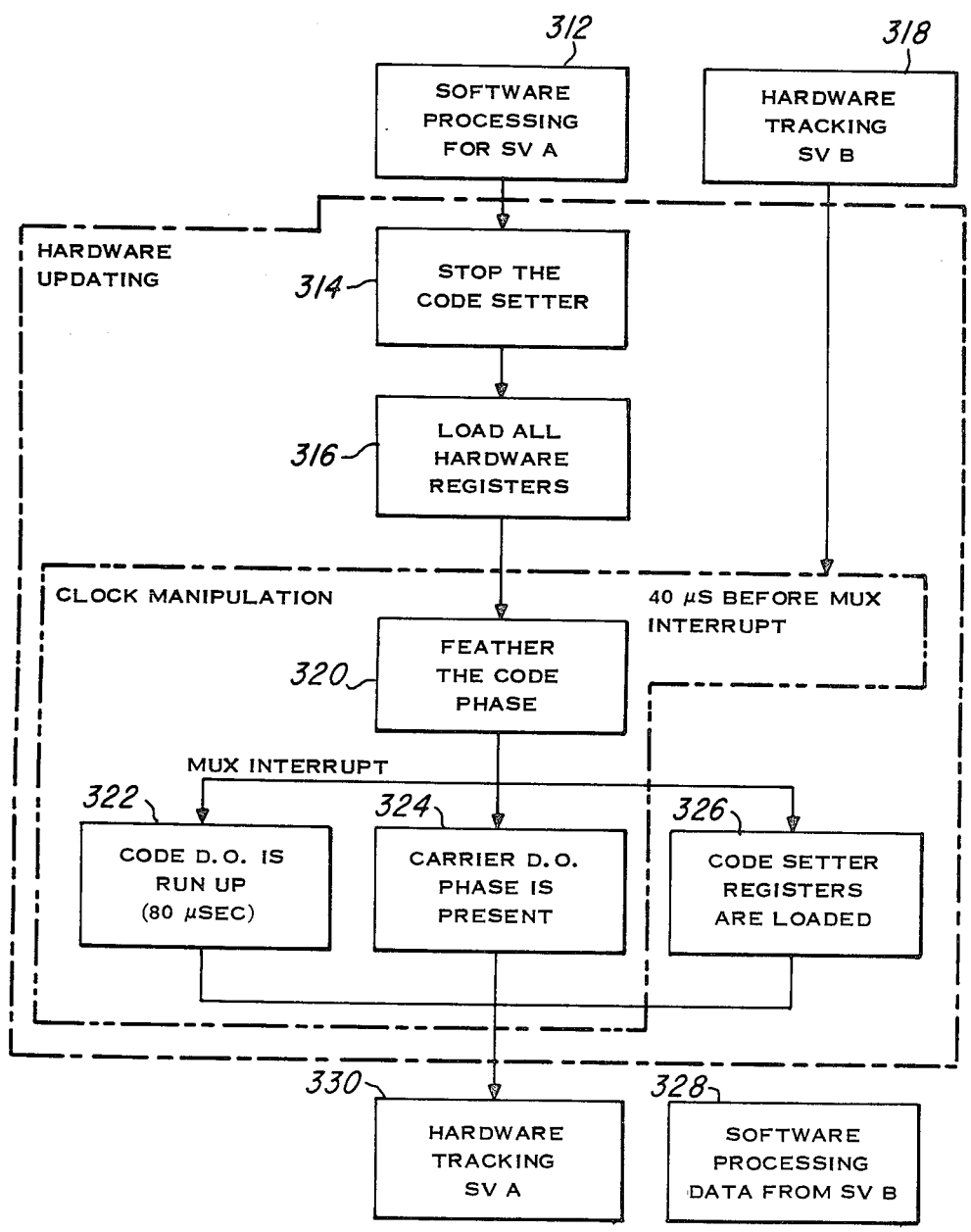

More specifically during the first dwell (i) (FIG. 4b) the microcomputer software is processing data (312) for space vehicle A. Next, the sequence of steps shown in the "Hardware Updating" box of FIG. 4b are performed as follows: the code setter 288 (FIG. 2a') is stopped (314) (FIG. 4b); then all the hardware registers of the code setter are loaded (316) for updating. During this time, the hardware is tracking (318) space vehicle B. During the clock manipulation shown in FIG. 4b, the code phase is feathered (320) a preselected period (40 microseconds) before multiplexer interrupt. Then at multiplexer interrupt the digital oscillator 55 (FIG. 2b') clocks for a selected period (80 microseconds) for runup (322) (FIG. 4b) and the digital oscillators are updated (324) (FIG. 4b). And simultaneously therewith the code setter 288 (FIG. 2a') is changed (326) (FIG. 4b).

The cycle is then repeated with the microprocessor software processing data from space vehicle B (328) (FIG. 4b) with the hardware tracking space vehicle A (330).

HIGH (L₁), LOW (L₂) FREQUENCY MULTIPLEXING

In all of the foregoing description only multiple SV multiplexing has been discussed. The foregoing description may now be augmented to allow $L_1/L_2$ multiplexing, on each SV, simultaneous with multiplexing between SVs. These augmentations will now be described.

Figure 3A:
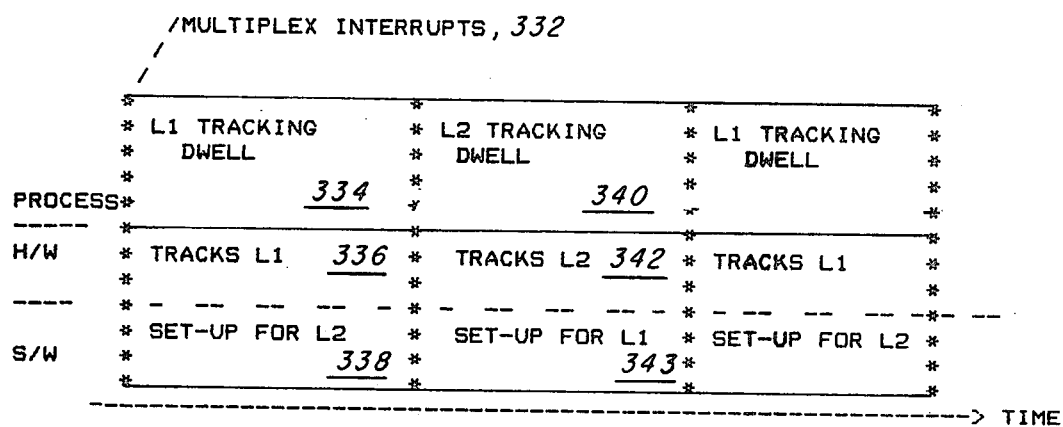
Figure 3C:
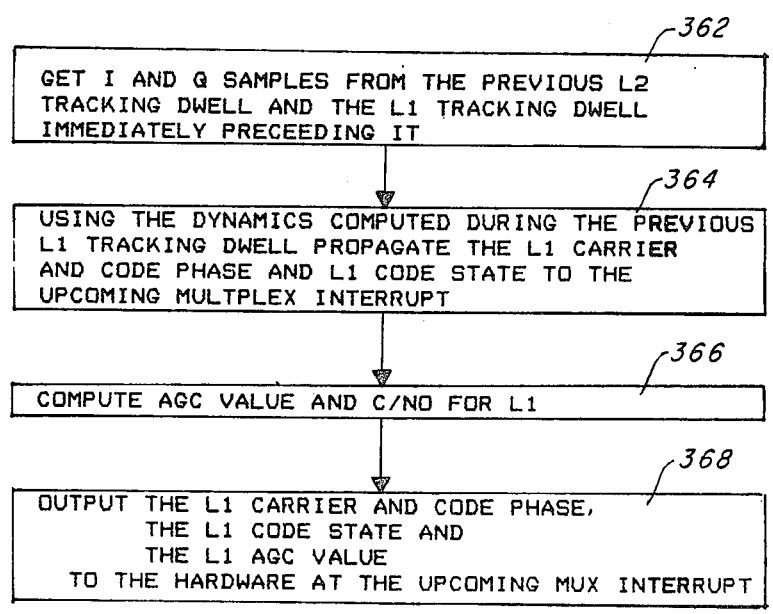
Figure 6:
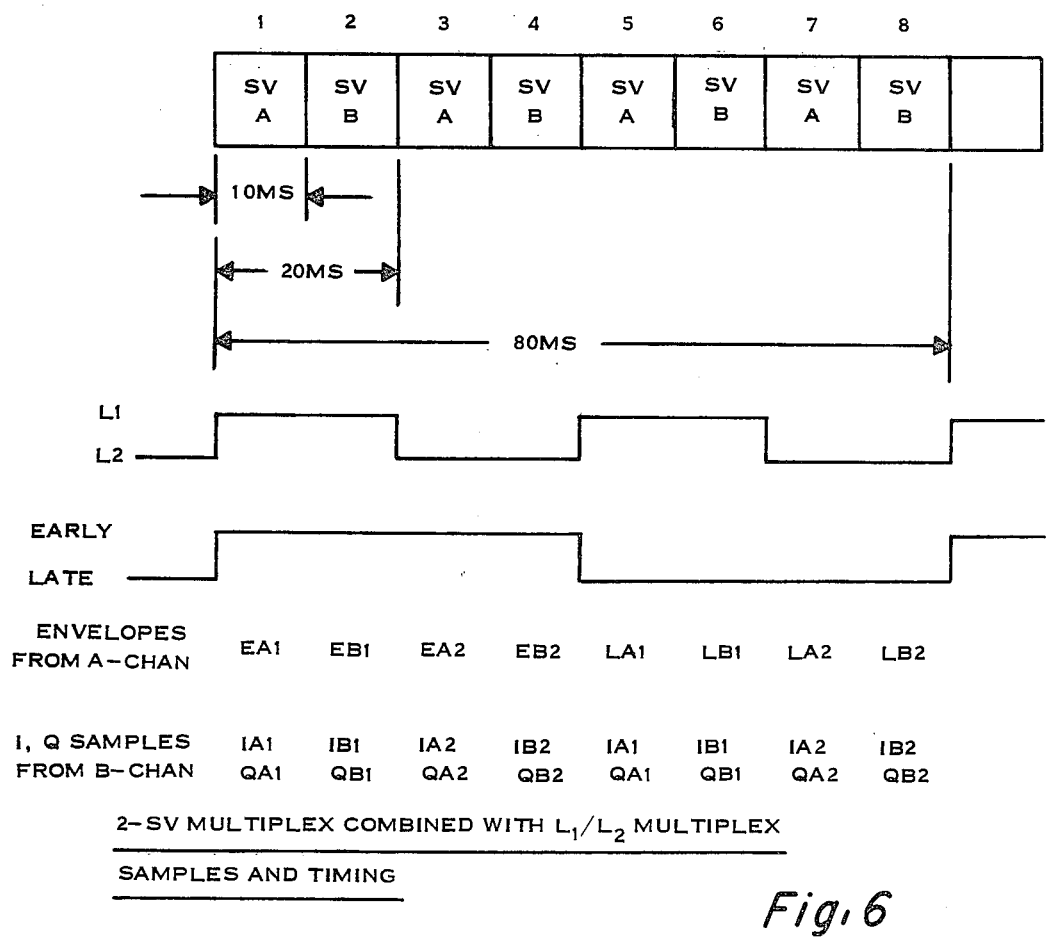
FIG. 6 is a timing diagram of the space vehicle multiplexing.
Figure 7:
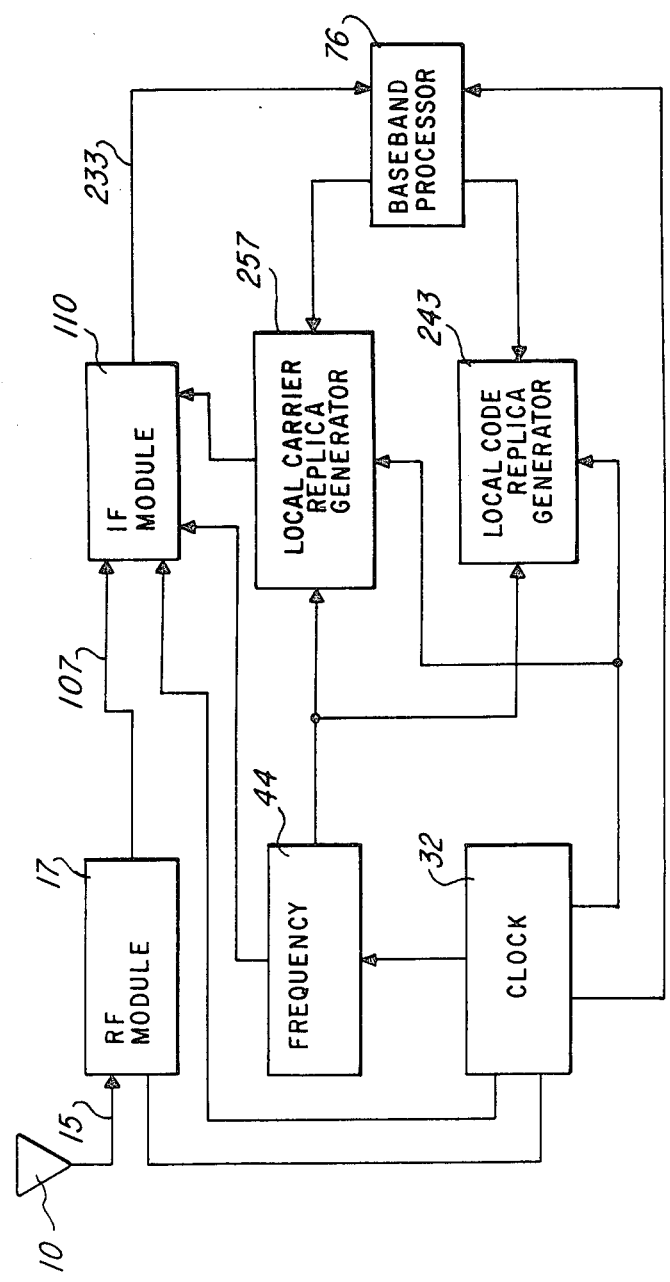
FIG. 7 is a block diagram of the primary elements of the invention.

Referring now to FIGS. 3a–3c in which is shown the $L_1/L_2$ multiplexing flowchart for each space vehicle and to FIG. 6 in which is shown the sampling and timing for two SV $L_1/L_2$ multiplexing. During the first time period (20 milliseconds) (332), the receiver dwells on the $L_1$ frequency (334): 10 milliseconds on space vehicle A. During the $L_1$ tracking dwell, the receiver hardware is tracking $L_1$ frequency (336) and the microcomputer is setting up for $L_2$ (338). Then, during the second time period (20 milliseconds) the process is the $L_2$ tracking dwell (340), first on SV A and then on SV B. During the $L_2$ dwell period the receiver hardware tracks the $L_2$ frequency (342) while the microcomputer is setting up for the $L_1$ (343); then the cycle repeats.

The following procedures are done independently for each of the plurality of SV signals being tracked in multiplex fashion. During $L_1$ tracking dwell (FIG. 3b), the microcomputer: gets I and Q samples from the previous $L_1$ and $L_2$ tracking dwells (344); computes the carrier $L_1/L_2$ sum error (346); computes the carrier L1/L2 difference error (348); computes the code L1/L2 sum error (350); computes code L1/L2 difference error (352); updates carrier and code dynamics by executing the following loop filters (354): carrier sum loop filter, carrier difference loop filter, code sum loop filter, and code difference loop filter; propagates $L_2$ carrier and code phase and the code state to the upcoming multiplex interrupt (356); computes narrow band (NB) AGC value and carrier to noise (C/NO) for $L_2$ (358); and outputs the $L_2$ carrier and code phase, $L_2$ code state and NB AGC value to the hardware at the upcoming multiplex interrupt (360).

Finally, during $L_2$ set up dwell (FIG. 3c) the microcomputer: gets I and Q samples from the previous $L_2$ tracking dwell and the $L_1$ tracking dwell immediately preceeding it (362); using the dynamics computed during the previous $L_1$ tracking dwell propagates the $L_1$ carrier and code phase and $L_1$ code state to the upcoming multiplexer interrupt (364); computes NB AGC value and C/NO for $L_1$ (366); and outputs the $L_1$ carrier and code phase, the $L_1$ code state and the $L_1$ NB AGC value (368) to the hardware at the upcoming multiplexer interrupt.

BASEBAND PROCESSOR SOFTWARE FUNCTIONS

Figure 5A:
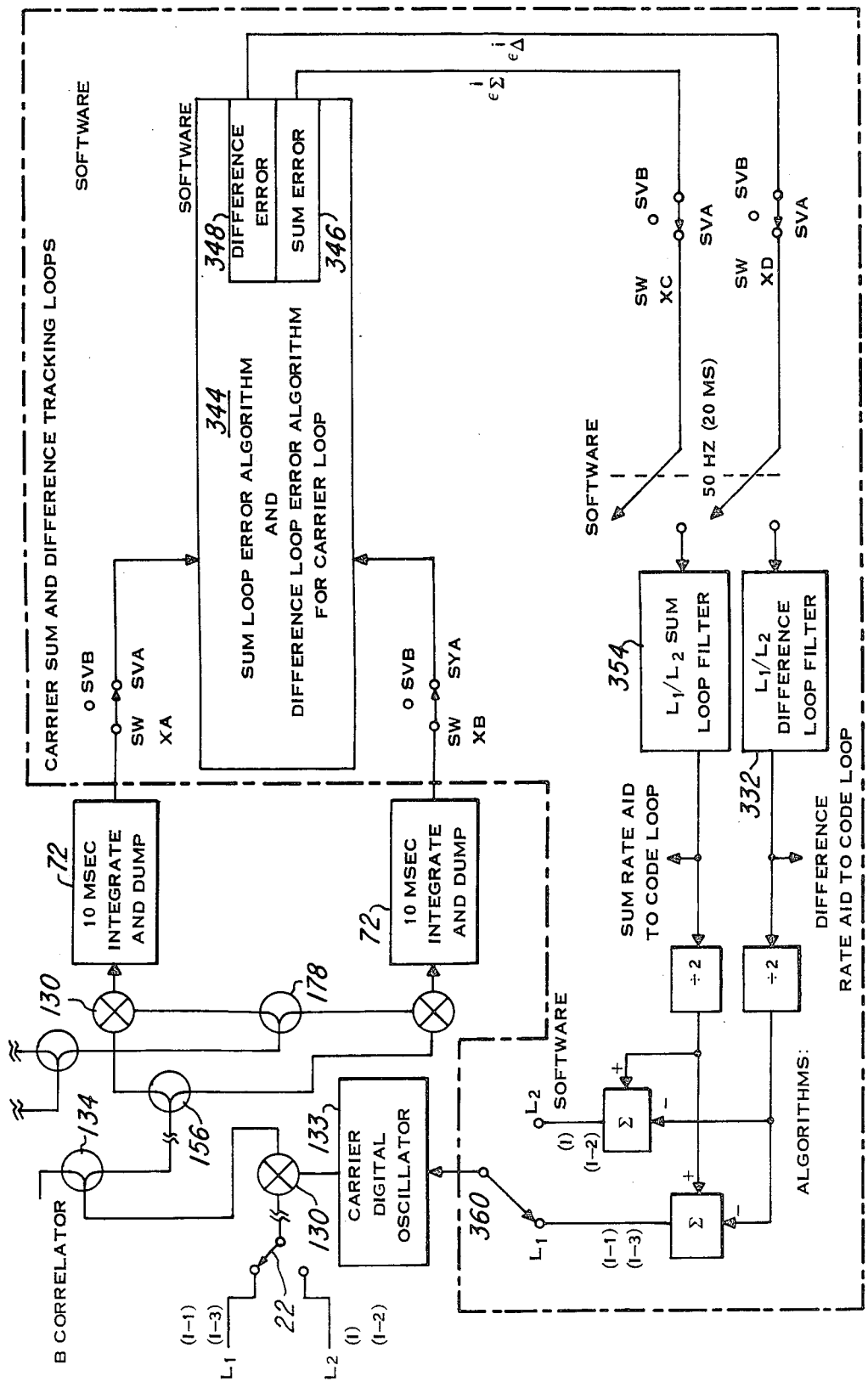
FIGS. 5a and 5b are functional drawings of the code and carrier tracking loops partly in block form and partly in limited schematics to show the digital processor's software producing sum and difference signals for $L_1$ and $L_2$ tracking and the relationship of the software to the implementing hardware and receiver.
Figure 5B:
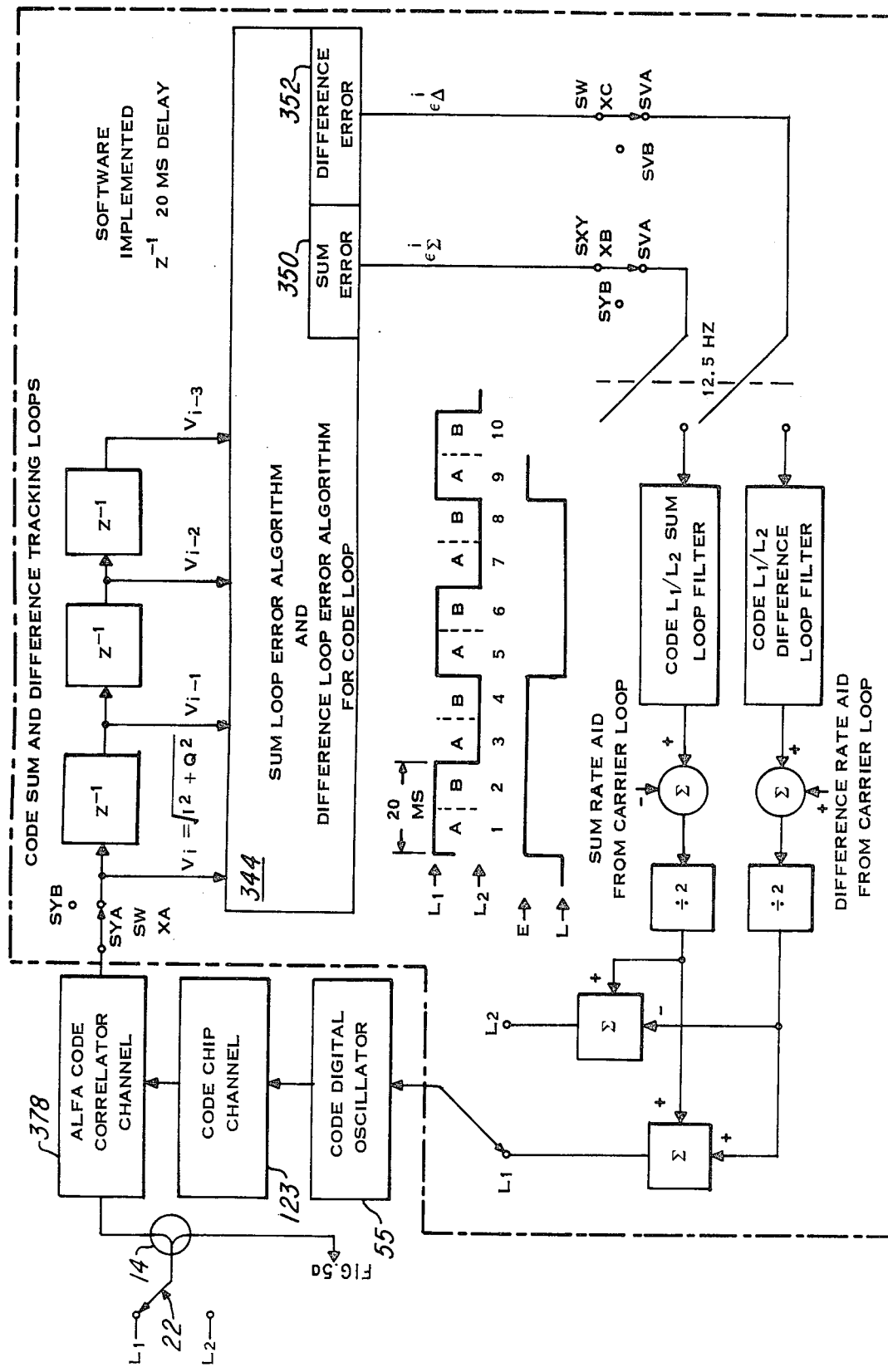

Referring now to FIGS. 5a and 5b, switches XA, XB, XC, and XD change state every 10 milliseconds thereby effecting multiplexing between SV A and SV B. The rest of this section describes software functions for $L_1/L_2$ multiplexing on a given SV.

The microprocessor 76 (FIG. 2c') computes the sum and difference errors from the $L_1/L_2$ I and Q signals into F-(frequency) words as indicated in FIGS. 5a and 5b. Switch 22 (FIGS. 1b, 5a and 5b) is switched, for example, every 20 milliseconds to receive alternately the $L_1$ and $L_2$ signals of a selected space vehicle. The $L_1$ and $L_2$ signals pass through a beta correlator (channel B, FIGS. 5a, and 2a–2c) and an alpha (α) correlator (channel A, FIGS. 5b and 2a–2c) which comprise the I and Q network hybrid 152 (FIG. 2b). The baseband processor samples every 20 milliseconds between the $L_1$ and $L_2$ (FIG. 5a) baseband output of predetection chip 72 (FIG. 2c). Thus, during each 20 milliseconds the $L_1$ and $L_2$ signals are applied in phase (I) and in quadrature (Q) to sum loop error algorithm and the difference loop error algorithm for the carrier loop 344. The algorithms are:

$$E_\Delta{}^i = +(Q_{i-1}I_i - Q_iI_{i-1}) + (Q_{i-1}I_{i-2} - Q_{i-2}I_{i-1}) \cdot S$$

where $S = \text{SIGN}\ [(Q_{i-3}+Q_{i-2})\ (Q_{i-1}+Q_i)+(I_{i-3}+I_{i-2})\ (I_{i-1}+I_i)]$ and $E_\Sigma{}^i = (Q_i+Q_{i-1}) \cdot \text{SIGN}\ (I_i+I_{i-1})$.

These sum ($E_\Sigma{}^i$) and difference ($E_\Delta{}^i$) carrier signals are thus applied to the $L_1/L_2$ sum loop filter (354, FIG. 3b) and the $L_1/L_2$ difference loop filter of carrier loop filter 232 (FIG. 2c') at a 50 Hz rate to produce the carrier F-(frequency) Words for the sum and difference errors (360, FIG. 3b) for the carrier loop and sum difference rate aid signals for the code loop. The F-Words are implemented in hardware in the local carrier replicate generator hardware circuit including the carrier D.O. 133 (FIGS. 5a, and 2a', 2b') and fed into mixer 130 (FIGS. 5a and 2a) of the IF module.

Similarly, the $L_1$ and $L_2$ signals of the selected space vehicle are switched by switch 22 (FIGS. 5b, and 1b) through the I and Q network to the alpha (α) code correlator (IE ENV. Det.) channel 378 (FIGS. 5b, 2a–2c). During the 20 milliseconds interval the I and Q digital samples are alternately applied to the sum loop error algorithm and difference loop eror algorithm 344 for the code loop. The algorithms are:

$$E_\Sigma^i = \frac{(V_{i-5}+V_{i-3})-(V_{i-7}+V_{i-1})}{(V_{i-5}+V_{i-3})+(V_{i-7}+V_{i-1})} + \frac{(V_{i-6}+V_i)-(V_{i-4}+V_{i-2})}{(V_{i-6}-V_i)+(V_{i-4}+V_{i-2})}$$

and $$E_\Delta^i = \frac{(V_{i-5}+V_{i-3})-(V_{i-7}+V_{i-1})}{(V_{i-5}+V_{i-3})+(V_{i-7}+V_{i-1})} - \frac{(V_{i-6}+V_i)-(V_{i-4}+V_{i-2})}{(V_{i-6}+V_i)+(V_{i-4}+V_{i-2})}$$

These sum ($E_\epsilon{}^i$ 350, FIG. 3b) and difference ($E_\Delta{}^i$ 352, FIG. 3b) code error signals are thus applied to the code $L_1/L_2$ sum loop filter and code $L_1/L_2$ difference loop filter of the code loop filter 234 (FIG. 2c') at a 12.5 Hz rate and combined in adders with the sum and difference rate aid signals from the carrier loop to provide the F-(frequency) Words for the code loop. The F-Words are implemented in hardware in the local code replicate generation hardware circuit including the code D.O. 55 (FIGS. 5a and 2b') and the code carrier chip 123 (FIGS. 5b and 2a') and fed into the alpha code correlator (FIGS. 2a–2c).

MEMORY MAP INTERFACE

The interface between the Intermediate Frequency Unit and the processor is a Memory Map Interface (MMIF) set forth in Table I. Addresses F200 to F2FE in hex are the IFM MMIF for the Advanced Digital Reeiver. The Radio Frequency (RFM) interface is a MMIF except for the signal RF AGC OUT which is on the communications Register Unit interface. Addresses F300 and F302 in hex are the RFM MMIF for receiver. All memory locations in the receiver are one of three types, Read Only (R), Write Only (W), and Read/Write (R/W). The hardware signals that comprise the MMIF are as follows:

A. ADDRESSES (8 Lines)
 /UPA7 (MSB)
 /UPA8
 /UPA9
 /UPA10
 /UPA11
 /UPA12
 /UPA13
 /UPA14 (LSB)
B. DATA (8 Lines)
 TSD0 (MSB)   BIT 0
 TSD1         BIT 1
 TSD2         BIT2
 TSD3         BIT 3
 TSD4         BIT 4
 TSD5         BIT 5
 TSD6         BIT 6
 TSD7 (LSB)   BIT 7
C. CONTROL (6 Lines)
 /UPWE       (WRITE CONTROL)
 /EDIOE      (ADDRESS ENABLE CONTROL)
 UPDBIN      (READ/WRITE CONTROL)
 /TSREADY    (READY CONTROL)
 UPSEOC      (SYNCHRONIZED END OF CYCLE)
 /MBRESET    (POWER GOOD RESET)
D. INTERRUPTS (3 Lines)
 RFFTF       (20 MSEC)
 /IFDATARDY  (2.5 MSEC)
 /IFMUXCLK   (1.0 MSEC/2.5 MSEC/10 MSEC)

TABLE I
PROCESSOR/INTERMEDIATE FREQUENCY UNIT INTERFACE

| RXIFSNR ADDRESS | FUNCTION | | RESOLUTION |
|---|---|---|---|
| F200 | I(ALPHA) | 8 MSB BITS—R | |
| F202 | I(ALPHA) | 8 LSB BITS—R | +PS=+5 VOLTS |
| F204 | Q(ALPHA) | 8 MSB BITS—R | |
| F206 | Q(ALPHA) | 8 LSB BITS—R | −PS=−5 VOLTS |
| F208 | I(BETA) | 8 MSB BITS—R | |
| F20A I(BETA) | 8 LSB BITS—R | LSB=10V/2**8=39M VOLTS | |
| F20C | Q(BETA) | 8 MSB BITS—R | |
| F20E | Q(BETA) | 8 LSB BITS —R | |
| F210 | NOISE−Q(BETA) | 8 MSB BITS—R | |
| F212 | NOISE−Q(BETA) | 8 LSB BITS—R | |
| F214 | SAMPLE INTERVAL CONTROL 8 BITS—R/W | | |
| | 1. SAMPLE INTERVAL (SI) (BITS 3-7) | | |
| | SI=((BITS 3-7)+1)×625 MICROSEC | | |
| | 2. OPERATION SEQUENCE (BITS 0-1-2) | | |
| | A. NORMAL (ALPHA−BETA) | (X,0,0) | |
| | B. TEST (W/O CHOP−DATA) | (0,0,1) | |
| | C. /NORMAL (BETA−ALPHA) | (X,1,0) | |
| | D. NORMAL−NOISE ALPHA | (X,1,1) | |
| | E. TEST (W CHOP−DATA) | (1,0,1) | |
| F216 | BIT TIMING 8 BITS—R/W | | |
| | 1. 1.0K TIME DELAY | (BITS 3-7) | |
| | 2. DATA BEFORE | (BIT 2) | |
| | 3. DATA AFTER | (BIT 1) | |
| | 4. BIT 0 IS UNUSED | | |
| F218 | IF AGC CONTROL 8 BITS—W | | |
| Note: ADDRESSES F21A AND F21E ARE UNUSED | | | |
| F220 | CADOR F WORD (8 MSB)−W | | CADOR L1 BIAS IS −6KHZ |
| F222 | CADOR F WORD (8 BITS)−W | | CADOR L2 BIAS IS +7.6KHZ |
| F224 | CADOR F WORD (8 BITS)−W | | 444.8KHZ/(2**32) |
| F226 | CADOR F WORD (8 LSB)−W | | =103.56307 MICROHERTZ |
| F228 | CADOR RUNUP/PHASE WORD (8 MSB)−R/W | | 360/(2**32) |
| F22A | CADOR RUNUP/PHASE WORD (8 BITS)−W | | =83.8 NANO DEGREES |
| F22C | CADOR RUNUP/PHASE WORD (8 BITS)−W | | |
| F22E | CADOR RUNUP/PHASE WORD (8 LSB)−W | | |
| F230 | CADOR LOAD CONTROL (8 BITS)−W | | |
| | 1. MODE CONTROL (BITS 5,6,7) | | |
| | A. NORMAL (SLB) | (0,0,0) | |
| | B. CODE MUX | (0,0,1) | |
| | C. CARRIER MUX | (0,1,0) | |
| | D. PCODE SEARCH | (0,1,1) | |
| | E. NORMAL (LLB) | (1,0,0) | |
| | F. PHASE MUX | (1,0,1) | |
| | 2. BITS 0-4 ARE UNUSED | | |
| F232 | NOT USED | | |
| F234 | MUXCLK CONTROL−W | | |
| | 1. MUXCLK CTL (BITS 2-7) | | |
| | MUXCLK=((BITS 2-7)+1)×625 MICROSECONDS | | |
| | 2. RFMUXCLK (BIT 1) | | |
| | 3. BITS 0 IS UNUSED | | |
| F236 | DBCLK PHASE CONTROL (MSB)−R/W | | 625/278=2.2482 microsec |
| | 1. 180 DEGREE CONTROL (BIT 7) | | |
| | 2. BITS 0-6 ARE NOT USED | | |
| F238 | DBCLK PHASE CONTROL (8 LSB)−R/W | | |
| NOTE: F23A AND F23C ARE NOT USED | | | |
| F23E | CODOR LOAD CONTROL (8 BITS)−W | | |
| | 1. MODE CONTROL (BITS 5,6,7) | | |

TABLE I-continued
PROCESSOR/INTERMEDIATE FREQUENCY UNIT INTERFACE

|   |   |   |
|---|---|---|
|   | A. NORMAL (SLR) | (0,0,0) |
|   | B. CODE | |
|   | D. (0,0,1) | |
|   | C. CARRIER MUX | (0,1,0) |
|   | D. PCODE SEARCH | (0,1,1) |
|   | E. NORMAL (LLR) | (1,0,0) |
|   | F. PHASE MUX | (1,0,1) |
|   | 2. BITS 0-4 ARE UNUSED | |
| F240 | CODOR F WORD (8 MSB)—W | |
| F242 | CODOR F WORD (8 BITS)—W | |
| F244 | CODOR F WORD (8 BITS)—W | |
| F246 | CODOR F WORD (8 LSB)—W | |
| F248 | CODOR RUNUP/PHASE WORD (8 MSB)—W/R | |
| F24A | CODOR RUNUP/PHASE WORD (8 BITS)—W | |
| F24C | CODOR RUNUP/PHASE WORD (8 BITS)—W | |
| F24E | CODOR RUNUP/PHASE WORD (8 LSB)—W | |
| F250 | X1A CODE SETTING WORD (8 LSB)—R/W | |
| F252 | X1B CODE SETTING WORD (8 LSB)—R/W | |
| F254 | X2A CODE SETTING WORD (8 LSB)—R/W | |
| F256 | X2B CODE SETTING WORD (8 LSB)—R/W | |
| F258 | X1A CODE SETTING WORD (4 MSB)—R/W | |
|   | 1. X1A MSB (BITS 4-7) | |
|   | 2. BITS 0-3 ARE UNUSED | |
| F25A | X1B CODE SETTING WORD (4 MSB)—R/W | |
|   | 1. X2A MSB (BITS 4-7) | |
|   | 2. BITS 0-3 ARE UNUSED | |
| F25C | X2A CODE SETTING WORD (4 MSB)—R/W | |
|   | 1. X2A MSB (BITS 4-7) | |
|   | 2. BITS 0-3 ARE UNUSED | |
| F25E | X2B CODE SETTING WORD (4 MSB)—R/W | |
|   | 1. X2B MSB (BITS 4-7) | |
|   | 2. BITS 0-3 ARE UNUSED | |
| F260 | CA CODE SETTING (DIV 1023 LSB)—W | |
| F262 | CA CODE SETTING (DIV 1023 MSB)—W | |
|   | 1. DIVIDE BY 1023 (BITS 6,7) | |
|   | 2. BITS 0-5 ARE UNUSED | |
| F264 | CA CODE SETTING (DIV 10)—W | |
|   | 1. DIVIDE BY 10 (BITS 4-7) | |
|   | 2. BITS 0-3 ARE UNUSED | |
| F266 | CA CODE SETTING (DIV 20)—W | |
|   | 1. DIVIDE BY 20 (BITS 3-7) | |
|   | 2. BITS 0-2 ARE UNUSED | |
| F268 | CODE FLAGS—W | |
|   | 1. X1A FLAG BIT 7 | |
|   | 2. X1B FLAG BIT 6 | |
|   | 3. X2A FLAG BIT 5 | |
|   | 4. X2B FLAG BIT 4 | |
|   | 5. CAFLAG BIT 3 | |
|   | A. IF CA COUNT = 1023; CAFLAG = 1 | |
|   | B. IF CA COUNT NOT 1023; CAFLAG = 0 | |
|   | 6. BITS (0-2) ARE UNUSED | |
| F26A | CODE OUTPUT MUX CONTROL—W | |
|   | 1. ALPHA CODE MUX CONTROL (BITS 5-7) | |
|   | A. CA EARLY CODE | (000) |
|   | B. CA PROMPT CODE | (001) |
|   | C. CA LATE CODE | (010) |
|   | D. TCODE | (011) |
|   | E. P EARLY CODE | (100) |
|   | F. P PROMPT CODE | (101) |
|   | G. P LATE CODE | (110) |
|   | H. P NOISE CODE | (111) |
|   | 2. BETA CODE MUX CONTROL (BITS 2-4) | |
|   | A. CA EARLY CODE | (000) |
|   | B. CA PROMPT CODE | (001) |
|   | C. CA LATE CODE | (010) |
|   | D. TCODE | (011) |
|   | E. P EARLY CODE | (100) |
|   | F. P PROMPT CODE | (101) |
|   | G. P LATE CODE | (110) |
|   | H. P NOISE CODE | (111) |
|   | 3. BITS 0-1 ARE UNUSED | |
| F26C | CODE TIMING CONTROL—W | |
|   | 1. P CODE PHASE (BIT 7) | |
|   | A. 0 = 0 DEGRESS | |
|   | B. 1 = 180 DEGRESS | |
|   | 2. CA CODE PHASE DIV BY 5 (BITS 4-6) | |
|   | 3. CA CODE PHASE DIV BY 2 (BIT 3) | |
|   | 4. CODE SETTER CLOCK CONTROL (BIT 2) | |
|   | A. 1 — ARM CODE SETTER CLOCK | |
|   | B. 0 — STOP CODE SETTER CLOCK | |
|   | 5. CA—CODE ADVANCE/RETARD CONTROL (BITS 0-1) | |

TABLE I-continued
PROCESSOR/INTERMEDIATE FREQUENCY UNIT INTERFACE

|  |  |  |  |
|---|---|---|---|
| | NOTE: CODE SETTER MUST BE STOPPED (BIT 2=0) | | |
| | A. NO ACTION | (0,0) | |
| | B. ADVANCE ONE CA—CODE CHIP | (0,1) | |
| | C. RETARD TWO CA—CODE CHIPS | (1,0) | |
| | D. RETARD ONE CA—CODE CHIP | (1,1) | |
| F26E | SATELLITE SELECTION—R/W | | |
| | 1. PKN (BITS 2-7) | | |
| | 2. TCODE CONTROL (BIT 1) | | |
| | A. 1 = TCODE RUN | | |
| | B. 0 = TCODE STOP | | |
| | 3. BIT 0 IS UNUSED | | |
| F270 | TEST POINT 1 (TEST1 MSB)—W | INPUT | OUTPUT |
| F272 | TEST POINT 1 (TEST1 LSB)—W | 0000 | +5v |
| 7274 | TEST POINT 2 (TEST2 MSB)—W | 01FF | 0v |
| 7276 | TEST POINT 2 (TEST2 LSB)—W | 03FF | −5v |

NOTE: ADDRESSES F278 THRU F27E ARE UNUSED
DENIAL OF ACCESS (DOA)

| ADDRESS | FUNCTION | RESOLUTION |
|---|---|---|
| F280 | CRYPTO VARIABLE (8 MSB)—W | |
| F282 | CRYPTO VARIABLE (8 BITS)—W | |
| F284 | CRYPTO VARIABLE (8 BITS)—W | |
| F286 | CRYPTO VARIABLE (8 BITS)—W | |
| F288 | CRYPTO VARIABLE (8 BITS)—W | |
| F28A | CRYPTO VARIABLE (8 BITS)—W | |
| F28C | CRYPTO VARIABLE (8 BITS)—W | |
| F28E | CRYPTO VARIABLE (8 LSB)—W | |
| F290 | CV CONTROL WORD (8 BITS)—W | |
| | 1. ENABLE CV CHANGE-OVER (BIT 7) | |
| | A. CHANGE-OVER = 1 | |
| | B. NO CHANGE-OVER = 0 | |
| | 2. CYPHER TEST BIT STREAM (BIT 6) | |
| | A. CTBS ENCRYPTED = 1 | |
| | B. CTBS NOT ENCRYPTED = 0 | |

RADIO FREQUENCY MODULE INTERFACE

| ADDRESS | FUNCTION | RESOLUTION |
|---|---|---|
| F300 | WIDEBAND AGC CONTROL (8 BITS)—W | 60dB/2**8 = 0.234dB |
| F302 | RFM CONTROL—W | |
| | 1. ANTSEL (BIT 7) | |
| | A. ANT1 = 1 | |
| | B. ANT2 = 0 | |
| | 2. L1L2SW (BIT 6) | |
| | A. L1 = 1 | |
| | B. L2 = 0 | |
| | 3. BITEPWR (BIT 5) | |
| | A. POWER ON = 1 | |
| | B. POWER OFF = 0 | |
| | 4. BITECTL (BIT 4) | |
| | A. BIT SIGNAL INJECTED BEFORE PREAMP = 1 | |
| | B. BIT SIGNAL INJECTED AFTER PREAMP = 0 | |
| | 5. BITESTRT (BIT 3) | |
| | P-CODE GENERATOR STARTS ON RISING EDGE OF THIS SIGNAL | |
| | 6. BITESEL (BIT 2) | |
| | A. P-CODE CHIP START AT BEGINNING-OF-WEEK = 1 | |
| | B. IFM SYNC PULSES DRIVE BITE P-CODE CHIP = 0 | |
| | 7. BITS 0-1 ARE UNUSED | |

CRU ADDRESS

| | | |
|---|---|---|
| 050E | RFAGCOUT-R | |
| | 1. NOISE BELOW −35 dbm = 1 | |
| | 2. NOISE ABOVE −35 dbm = 0 | |

OPERATION

Two types of multiplexing have been described. The first type is the multiplexing between two or more space vehicles on the same carrier frequency. The second type of multiplexing is that between the carrier $L_1$ and $L_2$ frequencies on the same space vehicle. Each type of multiplexing may be used without the other type, or both types of multiplexing may be combined. In this latter case both the carrier $L_1$ and $L_2$ frequencies of all of two or more space vehicles are tracked all with the same receiver hardware.

In the combined type of operation, the GPS receiver tracks two or more GPS space vehicles using closed loops that operate in a sampled-data sense. Each space vehicle transmits both a high ($L_1$) frequency and a low ($L_2$) frequency. Each space vehicle uses a distinct code. The receivers are multiplexed between the space vehicles and between the $L_1$-$L_2$ frequencies of each space vehicle. (The same space vehicle uses the same code on both frequencies). As the transmitted signal strengths of the space vehicles vary a computerized automatic gain control (AGC) 8 (FIG. 1c) is provided to stabilize the receive signals independently for each space vehicle.

The multiplexing cycle time is made short enough to support carrier tracking phase lock loop bandwidths wide enough to track the maneuvers of a high dynamic aircraft. Thus, if a third or fourth order loop is used, a andwidth of up to about 15 Hz is adequate. This means, for example, that each space vehicle of the two space vehicles is sampled for 10 milliseconds and each SV is sampled every 20 milliseconds (cycle time 20 milliseconds).

It will be appreciated that a higher order of space vehicles can be used. For example, a single hardware channel set could multiplex between four space vehicles by dwelling 5 milliseconds by each SV, and cycling back to a given space vehicle every 20 milliseconds.

In the case of a two space vehicle multiplex receiver, a first space vehicle may be searched for and acquired on one MUX time slot or on both time slots. Then the second space vehicle can be searched for while the first is being tracked.

The baseband processor (microcomputer) 76 (FIG. 2c') by actuating switch 22 (FIG. 1b) switches the receiver channel between the $L_1$ and $L_2$ frequencies for each space vehicle. Assuming for discussion the $L_1$ frequency is selected first, the $L_1$ frequency is divided into correlator channels alpha ($\alpha$) and beta ($\beta$) (FIGS. 2a, 2b, and 2c) frequencies and each downconverted into I (in phase) and Q (quadrature) or $I_\alpha$, $I_\beta$, and $Q_\alpha$, $Q_\beta$ baseband signals in accumulators 210, 212, 214, 216 and 218 (FIG. 2c).

The receiver is digitally implemented from the analog to digital (A/D) conversion of the I,Q baseband signals through the digitally controlled oscillators that create Doppler-containing signals for code and carrier local replica generation. The systems coherent frequencies and timing, together with digital signals, allows rapid, clear, unambigious switching of the hardware from one (digitally/stored) state to another.

"Digitally implemented" includes "software implementation"; particular items included are: A/D conversion of the baseband (I,Q) samples at an adequately high rate, for example, greater than 10 KHz; predetection filtering (e,g, integrate and dump); code/carrier error generation, code/carrier loop filters with states for multiple $L_1/L_2$ frequencies and/or multiple space vehicles, carrier/noise ratio estimation, signal level estimation, code/carrier master accumulators for multiple $L_2$ frequencies and/or multiple space vehicles, control calculations for multiplex operations, numerically controlled oscillators (digital oscillators) with both phase and frequency control for generation of both code and carrier Doppler signals, and AGC.

Multiplex timing is provided by a multiplex clock 28 (FIG. 2b) that is settable in phase (i. e. timing offset) in preselected increments (625 microseconds, 1/1600 Hz), from fundamental time frames (FTFs) of, for example, 20 milliseconds. This multiplexing increment is called a "MINC". For initial search the control processor sets this multiplex timing phase to either an arbitrary value or to a value chosen in accordance with the current bit sync phase of one or more space vehicles, with respect to FTFs. It is always possible, with 20 milliseconds cycle time, to set up the multiplex timing such that no data transitions are dwelled across for any level of multiplexing (two or more space vehicles per 20 milliseconds).

The control processor provides the master code and carrier accumulators (MA) 236 and 240 a set of software words (could be hardware words) which represents the state of code and carrier (phase) position estimates which are valid at periodic system reference time points (typically at the multiplex clock times). The carrier MA 236 contains both modulus (fractional-cycle) and integer-carrier cycle portions. The modulus portion of the carrier MA 236 must represent the actual phase state of the hardware carrier digital oscillator's phase accumulator 256, valid at these periodic system reference time points. The carrier MA 236 may be extended out beyond the one cycle modulus to make available carrier base delta-range measurements extending over many cycles of carrier Doppler. The fractional-cycle portion of the software carrier MA 236 (FIG. 2c') corresponds to the hardware carrier phase accumulator 256 (FIG. 2b'). Correspondence is established by updating the hardware accumulator 256 R times for each time the software accumulator is updated. R is 278×16 (4448) for updates made every 10 milliseconds as per our example. Thus, although the master accumulator 236 is keeping track of the accumulator carrier Doppler, the baseband processor is also accounting for the accumulated cycles to cancel the offsets in the coherent timing and frequency synthesis plan; these offsets are manifested at the carrier Doppler mixer 50 (FIG. 2a'); this offset word is added to the carrier loop filter 232 output.

The code master accumulator (MA) 240 (FIG. 2c') keeps track of the integer and fractional chips of code necessary to provide pseudo range measurements valid at a given time point, and to set up the code state (integer and fractional chips) for the next dwell on a given space vehicle. Integer chips are manifested in hardware by putting the code generator 226 into the correct (digital) state. Fractional chips are manifested in the hardware through manipulation of the phase of the code generator's clock. There is a set of code and carrier MAs 236 and 240 for each SV being tracked. These sets are updated totally independent of other space vehicles.

Because the frequency word represents only the Doppler portion of the passage of chips in real time, the effect of the nominal, zero-Doppler passage of chips is added to the code frequency word. Also the ratio (R) between hardware and software rates is also multiplexed in together with a fixed systematic reference frequency offset value. This offset is a ratio of 800 at the code digital oscillator 55 for the example described. The result is that there is no drift between the hardware and the software.

The p-code generator 124 has four feedback shift registers each of which goes through an "all-ones" state (epoch) every 400 microseconds. The phase of all these epochs with respect to a reference clock 284 (FIG. 2a') count has a one-to-one correspondence with the state of the code generator 226 (FIG. 2c'). From the desired chip count of the code, the epoch of the times of the four registers that correspond to the desired code phase relative to the reference clock can be determined using approximate equations that specify the code. These four quantities are called the code timing state (CTS) words.

The code setter 288, which is a series of counters, receives the CTS words and places the code generator 124 into the desired code phase state. This setting is done by loading each CTS word in a respective counter. The counters are all run from a clock 284 that is also driving the four shift registers and the code generator 124. On the particular clock edge that a given counter reaches its prescribed count, an epoch is produced and sets the corresponding code generator register of code generator 124 to its epoch (all ones) state. This happens independently for all four registers, each taking from zero to 400 microseconds to become synchronized. This process is called code catchup. When all four registers are synchronized, in less than 400 microseconds, the code generator 124 is running at the desired code phase.

For the above process, it is desired that transistions from tracking one space vehicle to the next be made using system time-based circuitry and software. However, the code generator/setter 288 runs off the code Doppler clock 284, which can have any phase with respect to the non-Doppler ($2f_1$) clock 32 and 38 (FIG. 1c), and therefore it is possible to miss transitions and hence wind up with an ambiguous Doppler code clock cycle. To prevent this problem, the code (Doppler) clock 284 (FIG. 2a) is quickly set to a fixed, predetermined phase (zero) and to a zero code Doppler frequency in anticipation of making a code timing state (CTS) word transfer at a given system clock edge, such as a multiplexer clock edge. This process is called "feathering". After feathering (40 microseconds), the code clock 80 has an unambiguous alignment (fractional-chip) code phase. This repositioning is achieved through a process called "runup". The baseband processor, on the basis of code loop filter 232 (FIG. 2c') frequency and the code MA 236 fractional chip state, calculates the runup frequency word that will advance the code clock 80 phase from the zero feathered position at multiplex clock 28 time to the exact value for the space vehicle signal phase for the space vehicle signal phase at the completion of the runup interval. During runup, the code digital oscillator 55 (FIG. 2b') is run at a relatively high Doppler rate to quickly rotate the code phase around to the desired position of a cycle without jumping it and risking a cycle miscount. The runup period (80 microseconds) is a fixed time for a given system design, and runs concurrently with the above described code catchup process.

Immediately after the runup interval, the code digital oscillator 55 will run at the code Doppler frequency that has been determined by the code loop filter 234 (FIG. 2c'). The code digital oscillator 55 is constructed to automatically execute the feathering process and to use the runup and code frequency words that have been stored in buffers prior to the appropriate moment of application.

To prevent spillover from one space vehicle dwell to another and avoid interaction in analog signal processing, it is necessary to keep a wide pre A/D bandwidth. A four kilohertz IF (2 KHz baseband) bandwidth, for example, keeps the spillover time down to a few hundred microseconds. The A/D sample rate must be wide enough (e.g. 12.8 KHz) to adequately sample these baseband signals.

It is apparent from the above-described operation, that the local timing of frequency synthesis be naturally coherent and edge aligned. Thus, the timing and frequency is derived from a single common oscillator 32 for the clocks as follows:

Clocks controlling I,Q, sample taking;
Clocks that provide interrupts to the processor so that it can execute algorithms paced by local system time;
Clocks providing I, Q, sample transfers;
Clocks providing processor output transfers (code, carrier digital oscillator, AGC control);
Clocks driving the code and carrier digital oscillators; and
The reference signal driving the code resolver (i.e., the SSB mixer that applies code Doppler to this reference signal).

The operations are carried at system (local) time; no drifting SV-locked time basis are used. The multiplex clock does not drift; it can, however, be changed discretely at appropriate times necessary to maintain clock alignment (plus or minus 312.5 microseconds) with SV data transitions. When this timing adjustment is made, appropriate extrapolations are used in the loop filter 233 and 235 executions to allow for the small time jump in digital oscillators 133 and 55 output control.

The single common oscillator 32 provides, for example, a 10.230400 MHz frequency (fl) applied to all carrier local oscillator synthesis, except that involving the carrier digital oscillator/resolver. The digital oscillators, moreover, are designed such that their outputs are precisely controllable in frequency and phase by digital command words. Hence, all frequencies and phases in the system may be maintained in a state that is known by the processor.

Although only a single embodiment of the invention has been described it will be apparent to a person skilled in the art that various modifications to the details of constructions shown and described may be made without departing from the scope of the invention.

What is claimed is:

1. An RF receiver for a global positioning system capable of multiple space vehicle (SV) tracking comprising:
   (a) an RF energy receiver for receiving coded high/low frequencies ($L_1$, $L_2$) from a plurality of SVs, each SV transmitting the $L_1$, $L_2$ signals on a code identifying the transmitting SV;
   (b) a switching means for alternately switching the RF receiver between the coded $L_1$, $L_2$ signals for detetion and downconversion to baseband;
   (c) a digital processing means,
   (d) replica code and $L_1$, $L_2$ signal producing hardware; and
   (e) a coherent time and frequency synthesis means connected to the RF receiver, replica code and $L_1$, $L_2$ signal producing hardware means and digital processing means, said digital processing means operatively connected to the RF receiver and replica coded and $L_1$, $L_2$ signal producing hardware means for producing RF receiver replica code $L_1$, $L_2$ signals for each SV to be tracked, and adjusting with respect to the coherent time and frequency synthesis circuit the states of the hardware replica receiver signals to align them with corresponding signals of each of the SVs at a rate that supports sampled data closed-loop tracking of the SVs without reacquisition of each SV being tracked.

2. An RF receiver for a global positioning system or the like including a sampled data closed-loop comprising:
   (a) an RF receiver for selectively receiving high/low frequencies from a plurality of SV signals on different codes;
   (b) a coherent time and frequency synthesis means operatively connected to the RF receiver;
   (c) hardware circuit means connected to the RF receiver for providing replica receiver signals having a definite hardware tracking state; and
   (d) a digital processing means, said digital processing means including a carrier and code frequency word generating means operatively connected to the RF receiver and hardware circuit means for adjusting with respect to the coherent time and frequency synthesis circuit the states of the hardware replica receiver signals of the hardware circuit means such that the hardware replica signals are in alignment with each of the corresponding signals of the plurality of SVs being tracked for maintaining information of the hardware tracking state for each of said plurality of SV signals and for sequentially setting up the replica hardware for the next cycle of operation on a given code and frequency and providing the receiver measurement outputs whereby the digital processing means controls the hardware circuit means in complete detail and keeps track of the state of the hardware circuit means in complete detail thereby achieving multiplexed operation in which the hardware circuit means is assigned sequentially to a plurality of SV signals at a switching rate that supports sampled data closed-loop tracking of the code and carrier signal components of each SV without the need for repetitive reacquisition of the signals.

3. An RF receiver for a global positioning system according to claim 2 wherein said hardware circuit means connected to the RF receiver and coherent time and frequency synthesis circuit for producing replica receiver signals having a definite hardware tracking state comprises:

a local carrier replicate generation hardware circuit means connected to the digital processing means and coherent time and frequency synthesis circuit for receiving from the digital processing means carrier phase information and a Doppler frequency data word, and from the coherent time and frequency synthesis circuit a selected reference frequency for producing an LO signal of the Doppler frequency word and reference frequency for the RF receiver.

4. An RF receiver according to claim 3 wherein the local carrier replicate generation hardware circuit means comprises:

(a) a carrier digital oscillator, said carrier digital oscillator including a phase holding register (latch) connected to the carrier master accumulator of the baseband processor for receiving the carrier phase information to preset the phase, a frequency holding register connected to the summer of the baseband processor for holding the Doppler frequency data word, a phase accumulator means, a frequency holding register, the phase accumulator means connected to the frequency holding register (latch) for accumulation as the carrier frequency word;

(b) read only memory/digital to analog converters (ROM/DACs) for conversion of the phase accumulator means output to digital sine and cosine signals to analog amplitudes; and (c) a signal sideband mixer connected to the ROM/DACs and coherent time and frequency synthesis circuit for combining the carrier difference Doppler frequency with a reference frequency for the RF receiver.

5. An RF receiver according to claim 2 wherein said hardware circuit means connected to the RF receiver and coherent time and frequency synthesis circuit for producing replica receiver signals having a definite hardware tracking state comprises:

a local code replicate generation hardware circuit means connected to the digital processing means and coherent time and frequency synthesis circuit for receiving from the digital processing means code runup control signals and code frequency words and from the coherent time and frequency synthesis circuit a selected reference for producing phase representing signals for producing pseudo noise, code $\alpha$ and code $\beta$ signals for the RF receiver.

6. An RF receiver according to claim 5 wherein the local code replicate generation hardware circuit means comprises:

(a) a digital oscillator having a code runup control register connected to the code master accumulator of the digital processing means, a code frequency holding register connected to the summer of the digital processing means for receiving the code frequency word, a holding register connected to the code runup control register and code frequency word holding register for selectively receiving the code frequency word and code runup word, a phase accumulator means connected to the holding register for selectively setting the phase accumulator means to zero phase (feathering), for running up the integer code state to the real code state required, and for producing a code Doppler frequency for a forthcoming sample interval whereby the feathering, set, runup, and steady-state frequency synthesis execution across the multiplex interrupt boundry is controlled;

(b) ROM/DCAS connected to the phase accumulator means for converting the phase outputs of the phase accumulator means to analog amplitudes;

(c) resolver connected to the ROM/DACS and coherent time and frequency synthesis circuit for mixing their outputs with a selected reference frequency;

(d) a code setter means connected to the resolver, a p-(precision) code generator and a ca-(coarse acquisition) code generator connected to the code setter means, said code setter means operative to synchronize the p-code generator and ca-code generator in response to the digital processing means space vehicle (SV) code selection to set the SV code identification in the p-code and ca-code generators; and (e) an output selector connected to the p-code and ca-code generators for selectively outputting SV pseudo noise signals, designated code $\alpha$ and code $\beta$ signals to the RF receiver for multiplexing space vehicle identifying codes to the RF receiver for SV multiplexing.

* * * * *